(12) United States Patent
de Fresart

(10) Patent No.: US 11,689,152 B2
(45) Date of Patent: Jun. 27, 2023

(54) SPRING CLIP FOR PHOTOVOLTAIC MODULE MOUNTING

(71) Applicant: ARRAY TECHNOLOGIES, INC., Albuquerque, NM (US)

(72) Inventor: Benjamin C. de Fresart, Albuquerque, NM (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 17/474,607

(22) Filed: Sep. 14, 2021

(65) Prior Publication Data

US 2022/0085752 A1 Mar. 17, 2022

Related U.S. Application Data

(60) Provisional application No. 63/195,629, filed on Jun. 1, 2021, provisional application No. 63/078,177, filed on Sep. 14, 2020.

(51) Int. Cl.
*H02S 30/10* (2014.01)
*F16B 2/24* (2006.01)
(Continued)

(52) U.S. Cl.
CPC ............... *H02S 30/10* (2014.12); *F16B 2/24* (2013.01); *H01R 4/2407* (2018.01); *H02S 40/34* (2014.12)

(58) Field of Classification Search
None
See application file for complete search history.

(56) References Cited

U.S. PATENT DOCUMENTS 10,530,293 B2    1/2020  Legall et al.
2008/0310913 A1* 12/2008  Urban .................... H02S 20/23
                                                              403/404
(Continued)

FOREIGN PATENT DOCUMENTS

EP      2867541 A2    5/2015
WO   WO-2016189182 A1 * 12/2016 ........... E04B 1/2403

OTHER PUBLICATIONS

International Search Report and Written Opinion for International Application No. PCT/US2021/050326 dated Jan. 11, 2022.

*Primary Examiner* — Steven M Marsh
(74) *Attorney, Agent, or Firm* — Maschoff Brennan

(57) ABSTRACT

A module mounting system may include a photovoltaic (PV) module frame including a mounting rail. The module mounting system may include a spring clip with a PV module frame interfacing element and a clip interfacing element. The spring clip may apply spring force via deformation to lock the PV module frame and a clip together. A second embodiment of the spring clip may include an upper component having one or more arms and a lower component having a central loop configured to rotate relative to each other and interface with the PV module frame or the mounting rail. A second embodiment of the module mounting system may include screwless clips including outer walls and inner walls coupled together as a continuous sheet of material. The screwless clips may couple to a respective mounting flange and a respective frame flange to lock the mounting purlin and the PV module frame together.

8 Claims, 24 Drawing Sheets

(51) Int. Cl.
*H02S 40/34* (2014.01)
*H01R 4/2407* (2018.01)

(56) References Cited

U.S. PATENT DOCUMENTS

| | | | |
|---|---|---|---|
| 2012/0205508 A1* | 8/2012 | Cusson | H02S 20/10 |
| | | | 248/231.81 |
| 2013/0102165 A1* | 4/2013 | DuPont | H02S 20/22 |
| | | | 439/95 |
| 2014/0026946 A1 | 1/2014 | West et al. | |
| 2016/0282018 A1 | 9/2016 | Ash et al. | |
| 2018/0062568 A1* | 3/2018 | Schulte | F24S 25/65 |
| 2019/0222169 A1* | 7/2019 | Yang | H02S 20/23 |
| 2021/0034863 A1 | 2/2021 | Sudkamp et al. | |
| 2021/0348633 A1 | 11/2021 | Friedrich et al. | |
| 2022/0060006 A1* | 2/2022 | Naugler | F16L 3/233 |

* cited by examiner

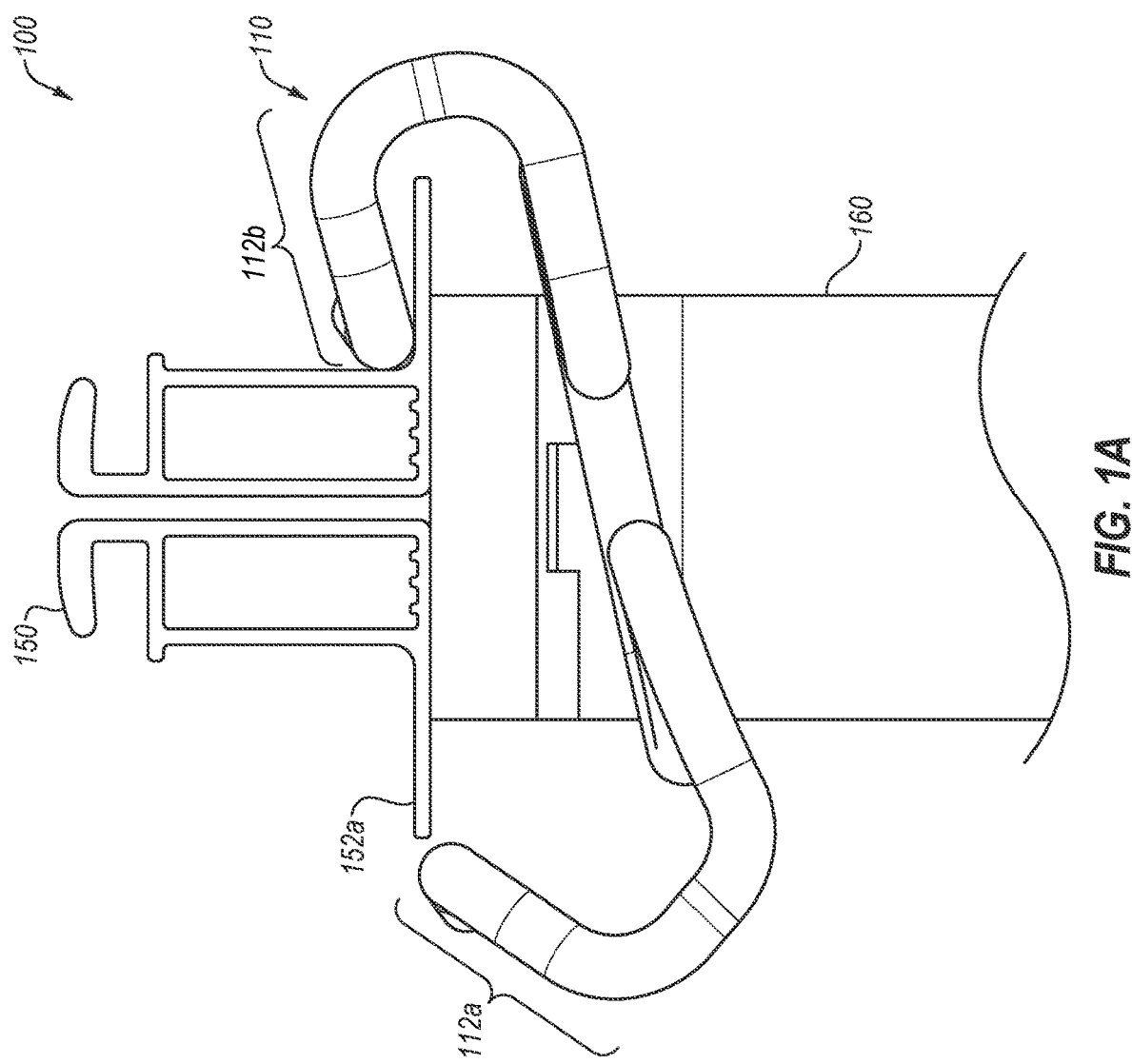

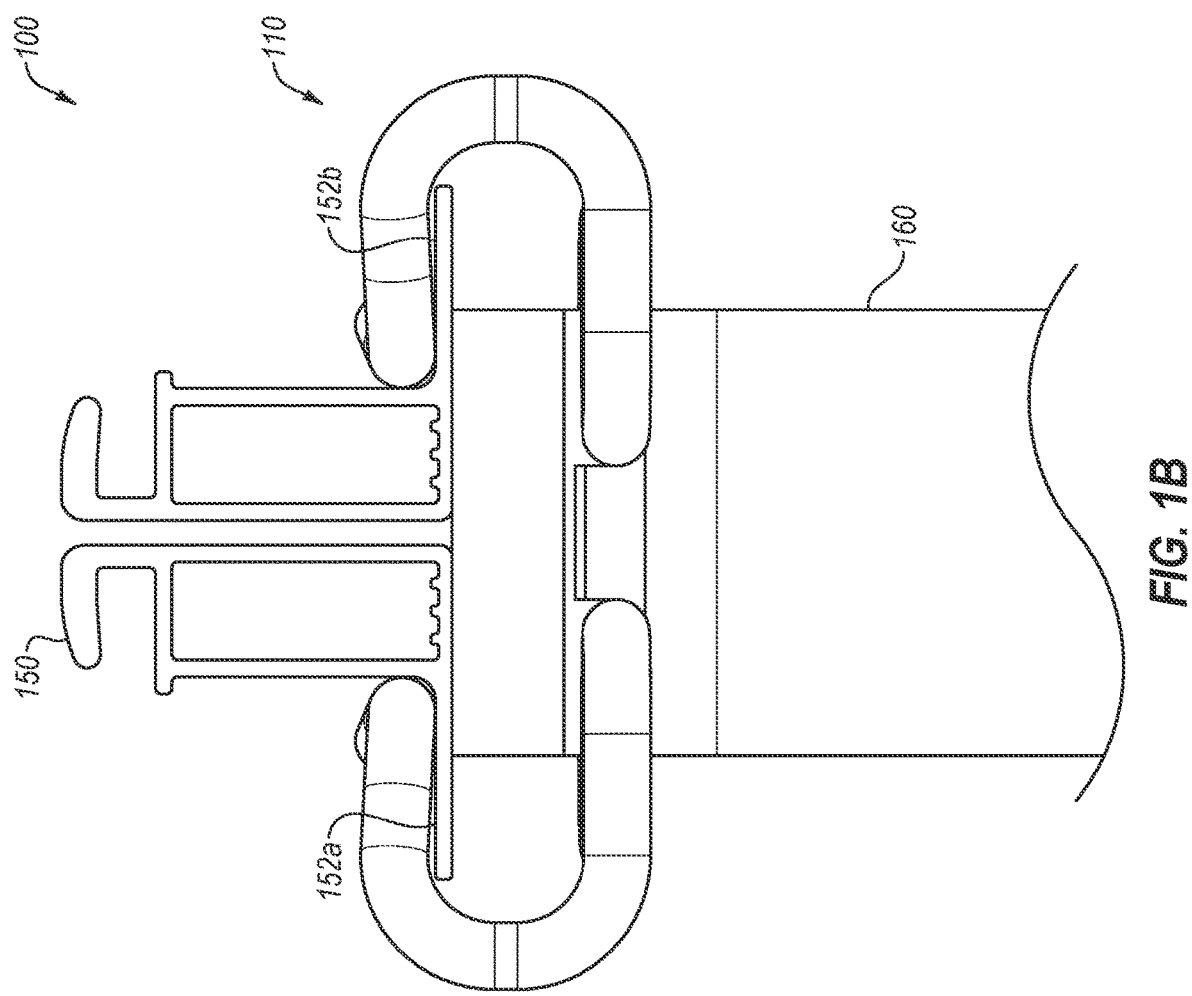

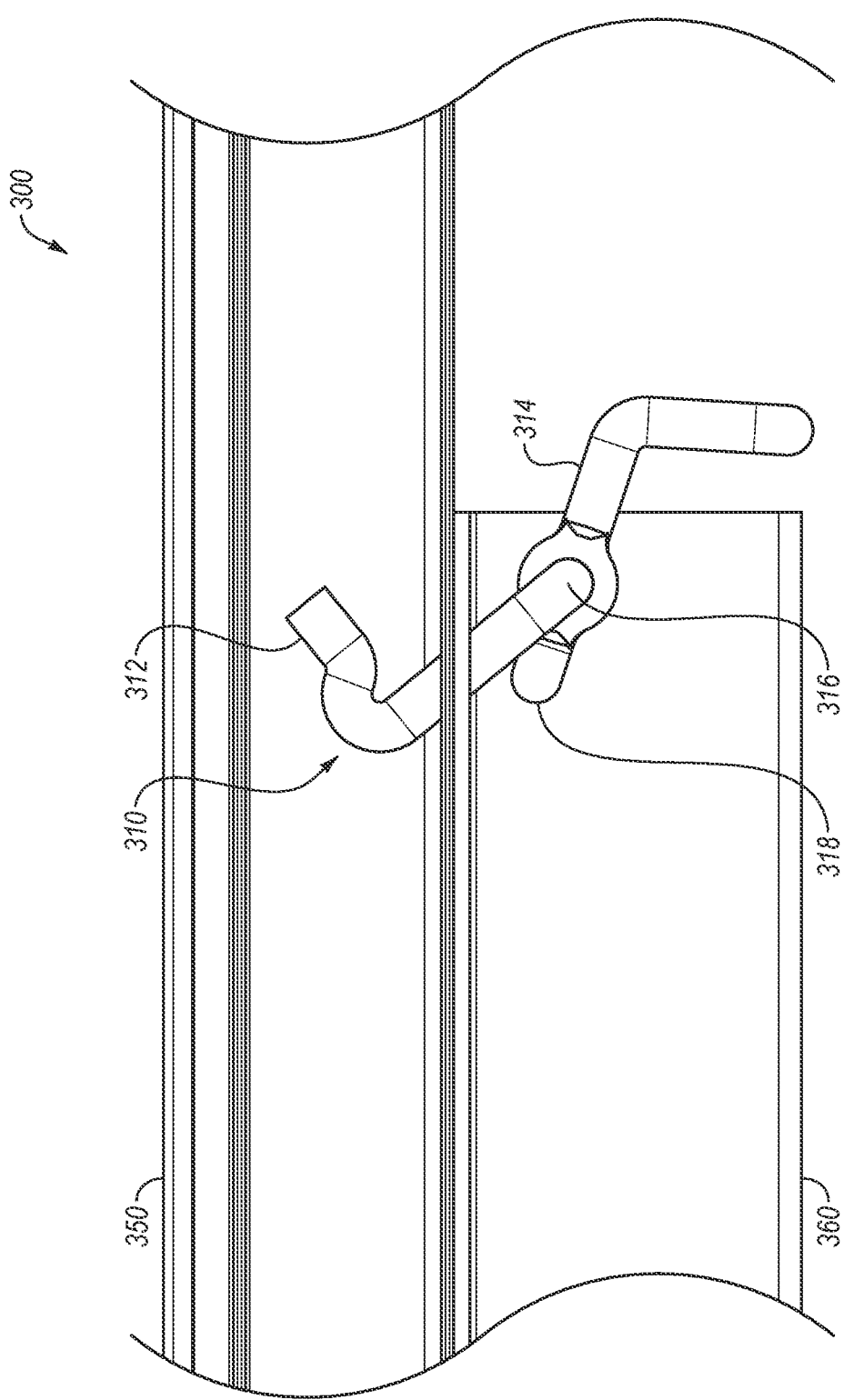

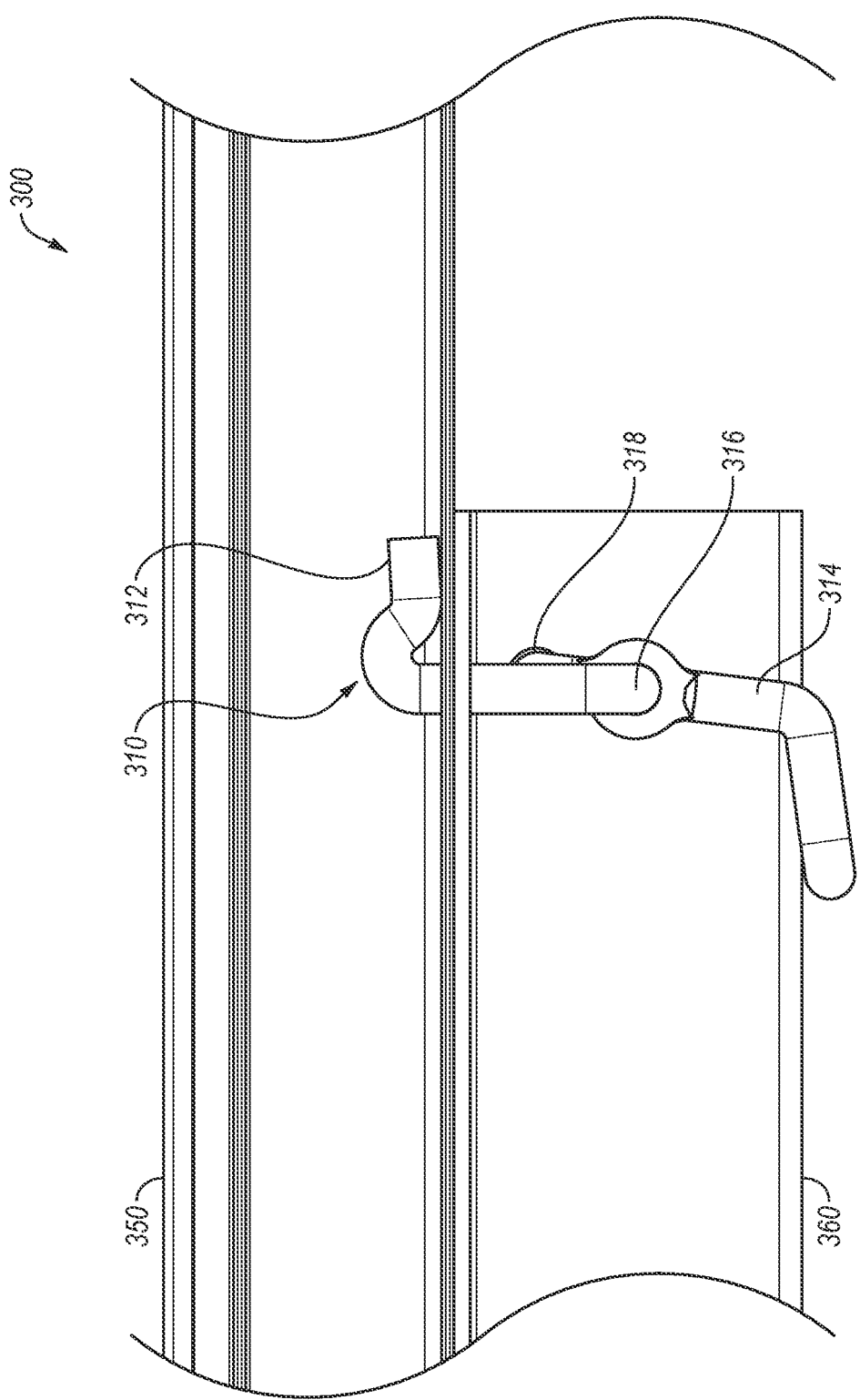

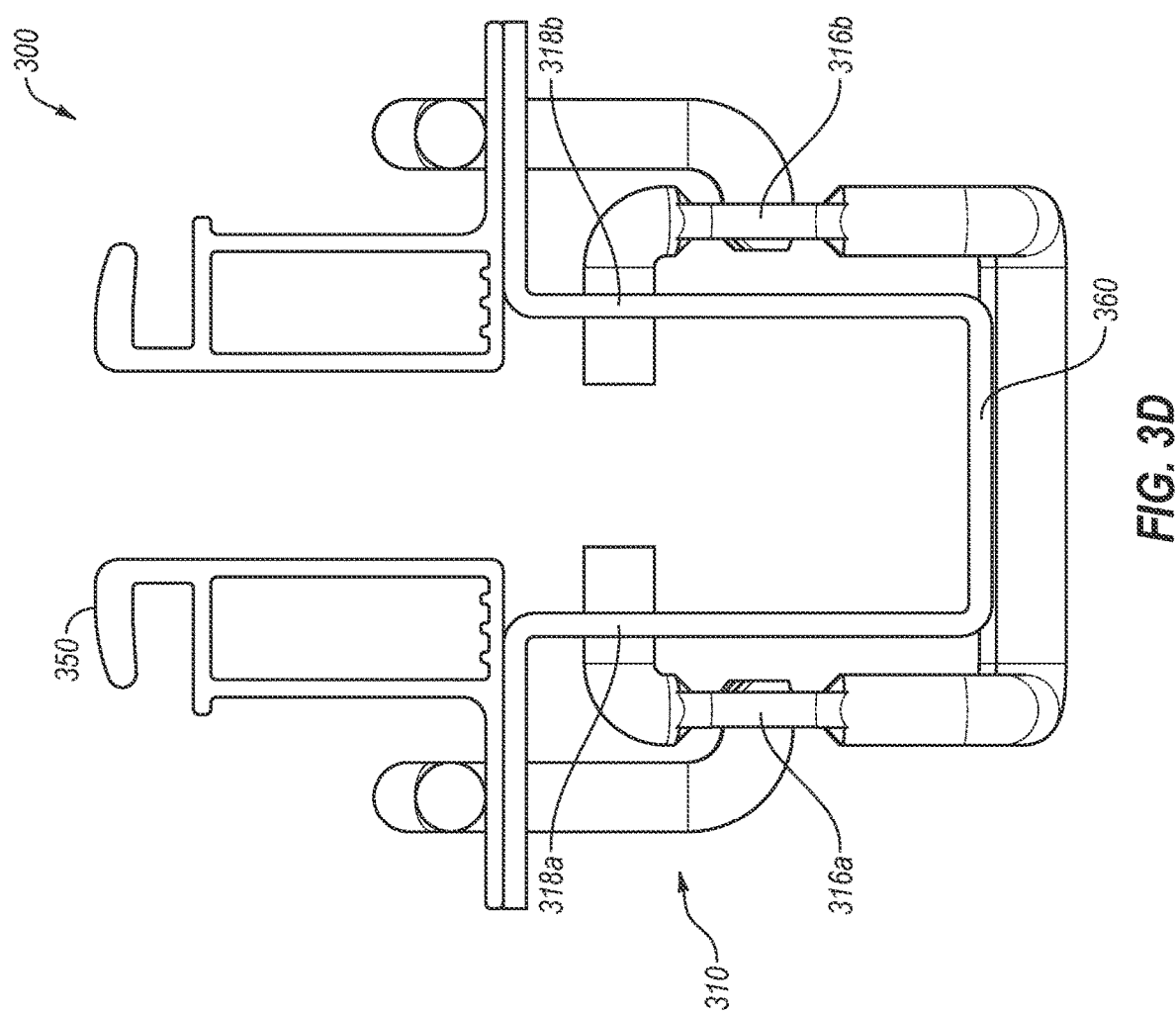

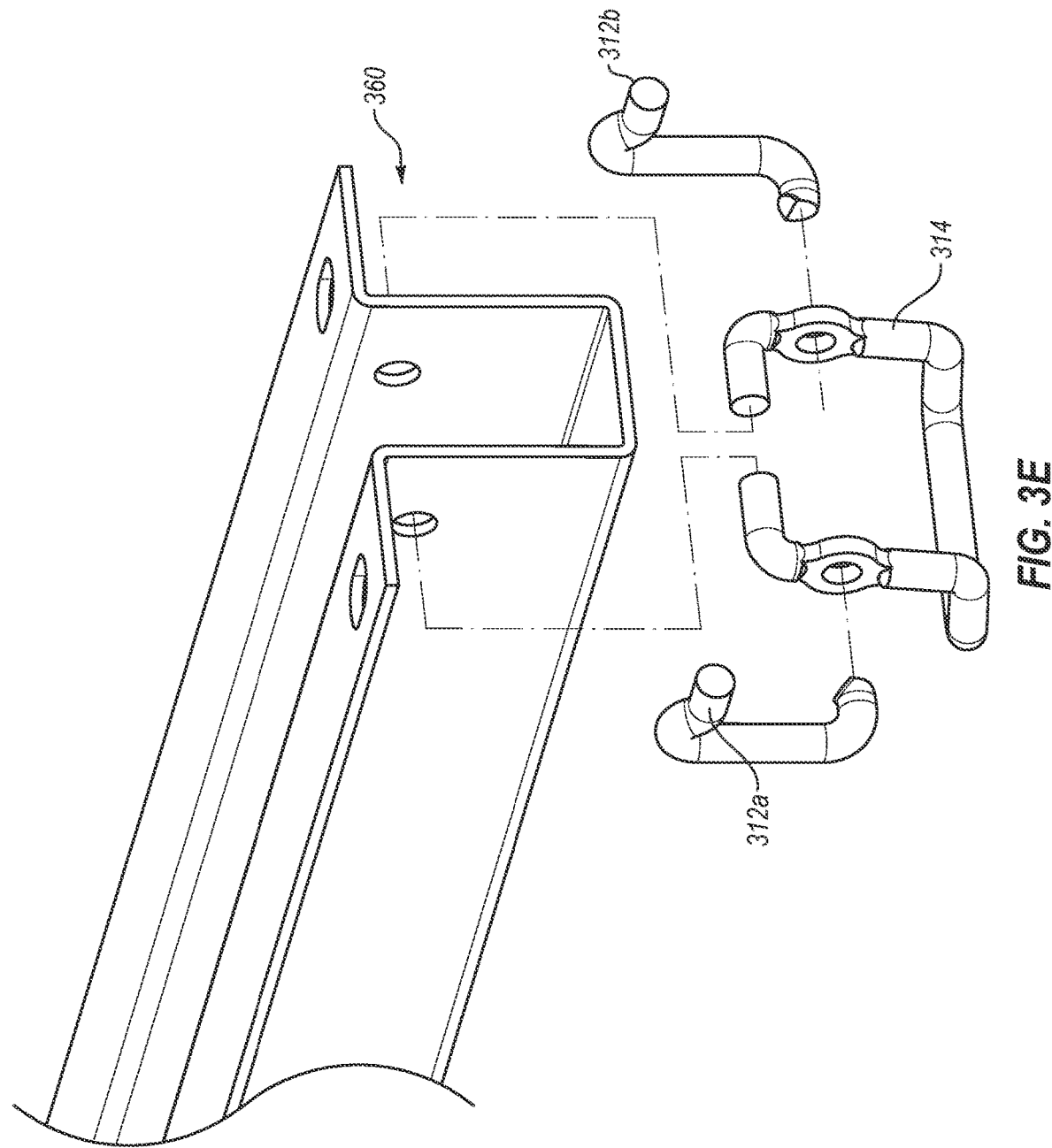

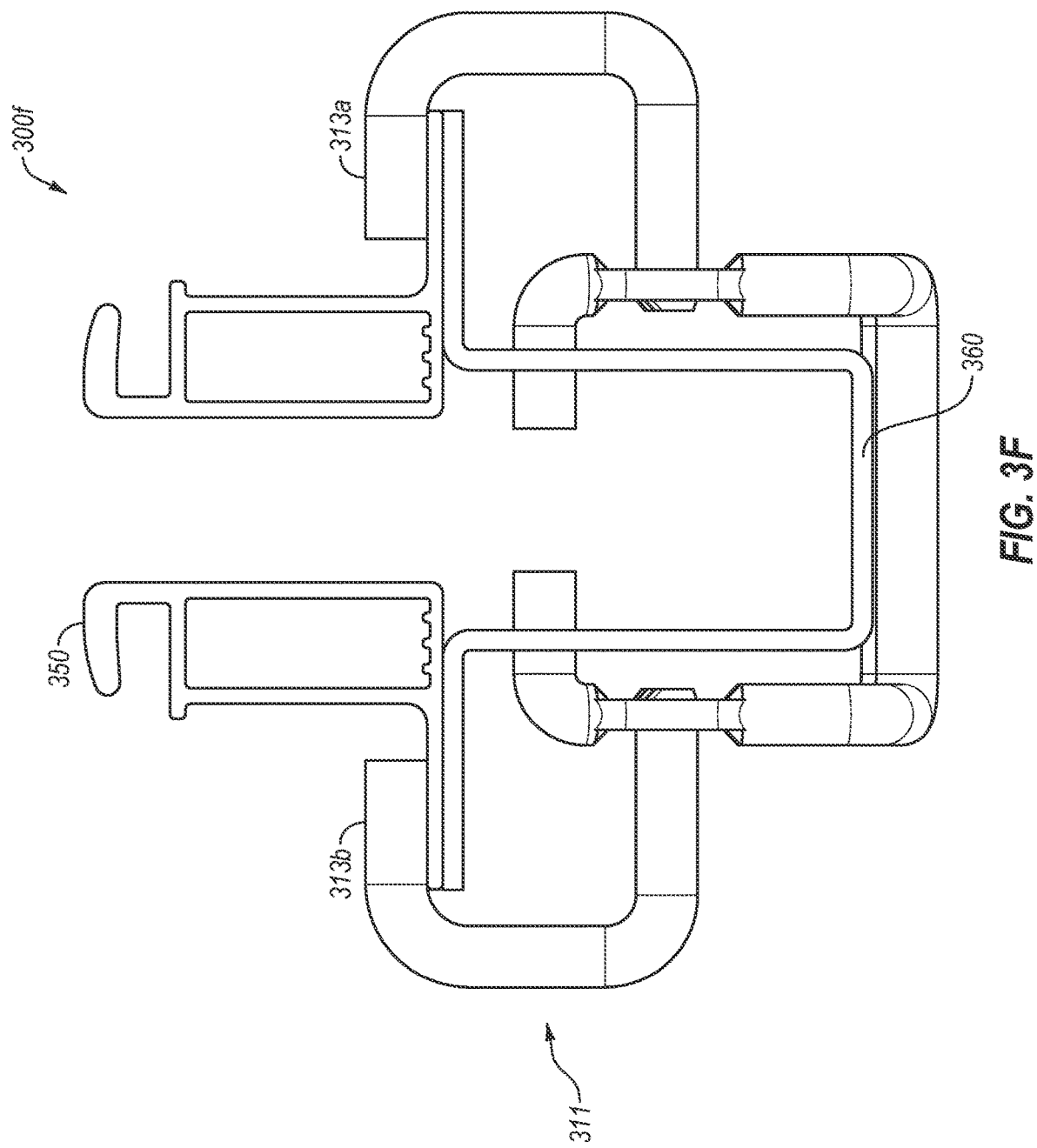

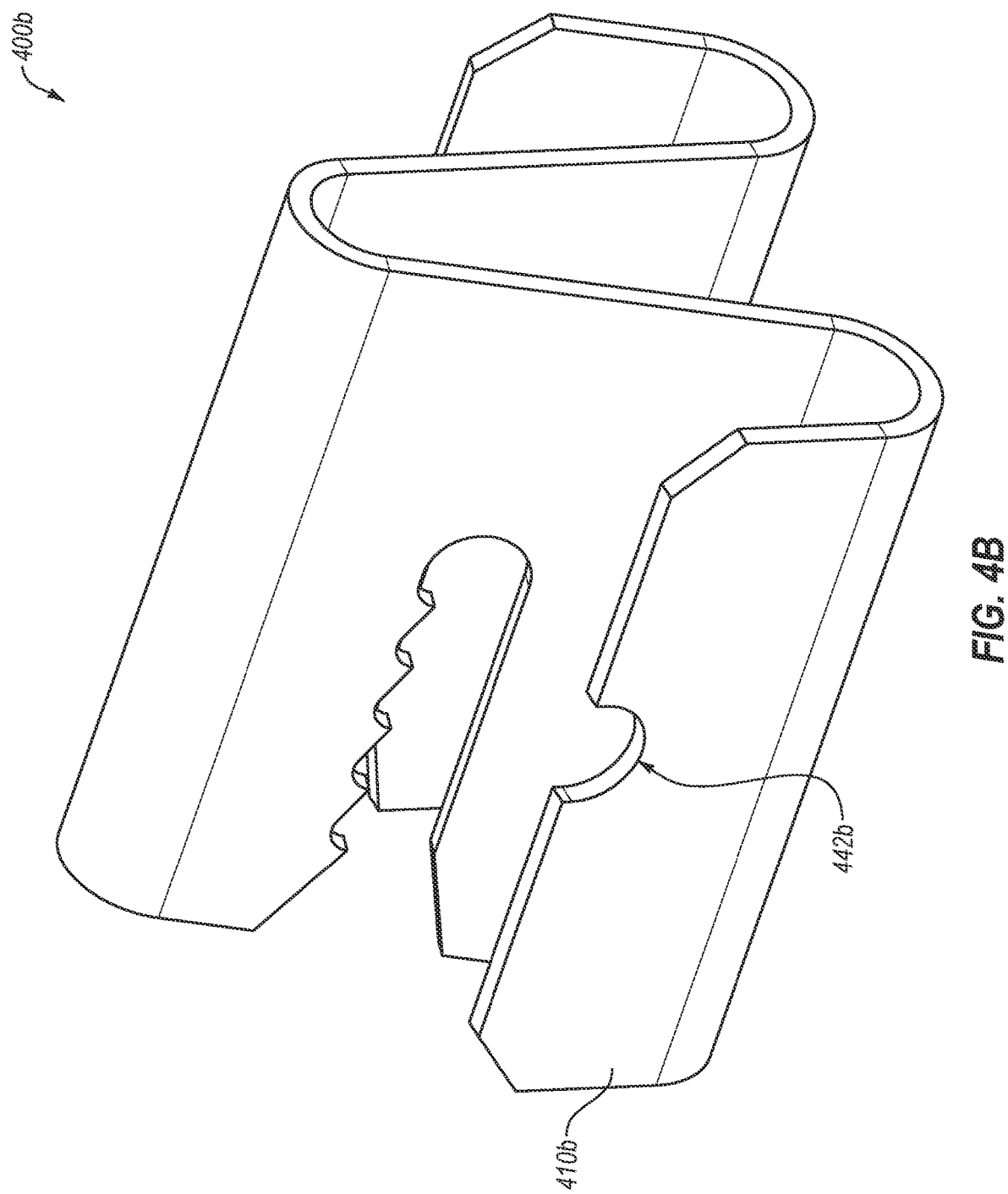

SPRING CLIP FOR PHOTOVOLTAIC MODULE MOUNTING

CROSS-REFERENCE TO RELATED APPLICATION

This application claims the benefit of U.S. Patent Application Ser. No. 63/078,177, filed on Sep. 14, 2020 and U.S. Patent Application Ser. No. 63/195,629, filed Jun. 1, 2021; the disclosures of which are incorporated herein by reference in its entirety.

THE FIELD OF THE DISCLOSURE

The present disclosure generally relates to spring clips for photovoltaic ("PV") module mounting.

BACKGROUND

Most PV modules are quite heavy because they use glass to encase the PV cells. A solar tracking system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. The PV modules with their associated frames must be mounted to the support structure of the solar array and the solar tracking equipment. However, there is a need for improved mounting approaches.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a module mounting system that includes a photovoltaic (PV) module frame enclosing one or more PV cells. The module mounting system may also include a mounting rail shaped to interface with the PV module frame and one or more support structures to which the mounting rail is coupled to keep the mounting rail off the ground. The module mounting system may additionally include a spring clip with a PV module frame interfacing portion and a mounting rail interfacing portion in which the spring clip is shaped to apply spring force via deformation of the spring clip to force the mounting rail and the PV module frame against each other.

One or more embodiments of the present disclosure may include a spring clip that includes an upper component including one or more arms. The spring clip may also include a lower component including a central loop in which the upper component and the lower component are configured to rotate relative to each other about a hinge point to transition from an initial position to a final position in which the final position causes the arms of the upper component to interface with a PV module frame and the central loop of the lower component to interface with the mounting rail to force the mounting rail and the PV module frame against each other.

One or more embodiments of the present disclosure may include a module mounting system that includes a mounting purlin including one or more mounting flanges extending horizontally from the mounting purlin and a PV module frame including one or more frame flanges extending horizontally from the PV module frames in which each of the frame flanges may interface against a respective mounting flange of the mounting purlin. The module mounting system may also include one or more screwless clips interfacing with the mounting flanges and the frame flanges in which each of the screwless clips includes one or more outer walls and one or more inner walls formed of a continuous sheet of material in a generally W-shaped profile.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which:

FIGS. 1A-1D illustrate an example embodiment of a module mounting system with a spring clip in accordance with the present disclosure;

FIGS. 3A-3E illustrate an additional another example embodiment of a module mounting system with a spring clip in accordance with the present disclosure;

FIG. 3F illustrate another example embodiment of a module mounting system with a spring clip in accordance with the present disclosure;

FIG. 4B illustrates an example embodiment of a second screwless clip for fastening PV module frames according to the present disclosure;

DETAILED DESCRIPTION

Figure 1C:
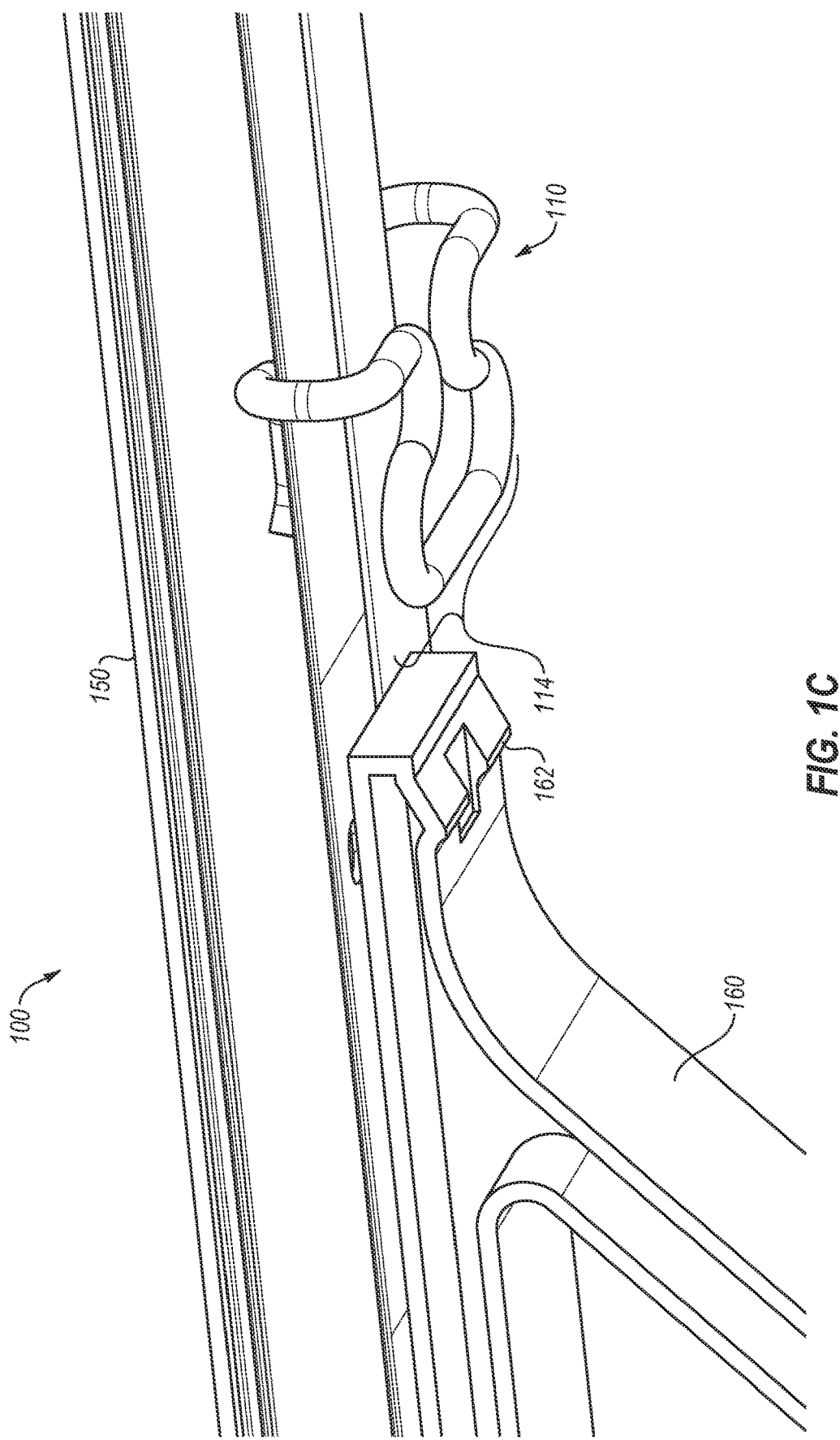

The present disclosure relates to improvements in mounting approaches for mounting PV modules and their associated frames to the support structure of an array of PV modules. For example, a row of PV modules may be mounted to a torque tube that facilitates tracking of the sun with the PV modules. In the present disclosure, a module mounting system may include a PV module frame for holding the PV modules themselves, and a mounting rail that is fixedly coupled to a torque tube or other support structure of the array of PV modules. According to the present disclosure, a spring clip may operate to lock the PV module frame relative to the mounting rail. The spring clip may provide a device that generates spring force due to deformation of the spring clip and applies the spring force to the PV module frame and the mounting rail, locking them into place relative to each other. Various implementations of the form factor of the spring clip are contemplated within the present disclosure.

By using a spring clip in accordance with at least some of the embodiments of the present disclosure, a tool-less installation approach may be undertaken. For example, instead of maintaining and keeping a large number of pneumatic drivers, battery-operated drills, and calibrated torque wrenches that are able to drive bolts or other connecting devices to specified torques and have quality control features in place to verify such machinery, the tool-less installation may avoid all such costs and burden. With threaded fasteners, the clamping force is achieved through the application of torque on the fastener, which in an uncontrolled outdoor environment is inherently variable based on the condition of the threads, tools, etc. Instead, any constraints or concerns regarding proper force-loading, etc. may be undertaken during quality control of a manufacturing process and/or the design process for the spring clips themselves, where it is easier to control. The spring clips may be designed to lock the mounting rail and the PV module frame together even when exposed to expected forces, such as wind, snow, rain, solar tracking, etc. Additionally, the spring clips may be designed to be installed by hand, or with the assistance of a simple off-the-shelf tool like a crowbar or prybar. While the use of customized tools is within the scope of the present disclosure, the use of such tools may or may not be required, depending on the design of the spring clip.

The present disclosure also relates to clips that may be used to couple a PV frame to a mounting rail or other structure, such as a mounting purlin. The clip may include features to bite into either or both of the PV frame and mounting structure to facilitate locking the two components together and/or facilitate electrically coupling the two together to provide grounding of the PV frame to the mounting structure. In some embodiments, one or both of the structures being coupled together may include a gap or hole into which a tooth or locking lip may extend to lock the clip into place and/or to lock the PV frame and the mounting structure together.

In the following paragraphs, embodiments will be described in detail by way of example with reference to the accompanying drawings, which may or may not be drawn to scale, and the illustrated components are not necessarily drawn proportionately to one another. Throughout this description, the embodiments and examples shown should be considered as examples, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

FIGS. 1A-1D illustrate an example embodiment of a module mounting system 100 with a spring clip 110 in accordance with the present disclosure. The module mounting system 100 may include a PV module frame 150 for holding the PV modules themselves, and a mounting rail 160 that is fixedly coupled to a torque tube or other support structure of the array of PV modules. The spring clip 110 may operate to lock the PV module frame 150 relative to the mounting rail 160.

The spring clip 110 may include one or more PV module interfacing portions, such as wings 112, for interfacing with flanges 152 of the PV module frame 150. The wings 112 may be spaced apart such that (as shown in FIG. 1A) one wing 112b of the spring clip 110 may be slid over one flange 152b and still have room for the other wing 112a to slide past the other flange 152a. Once past the other flange 152a, the spring clip 110 may be centered between the two flanges 152 such that both wings 112 are interfacing with the flanges 152.

Figure 1D:
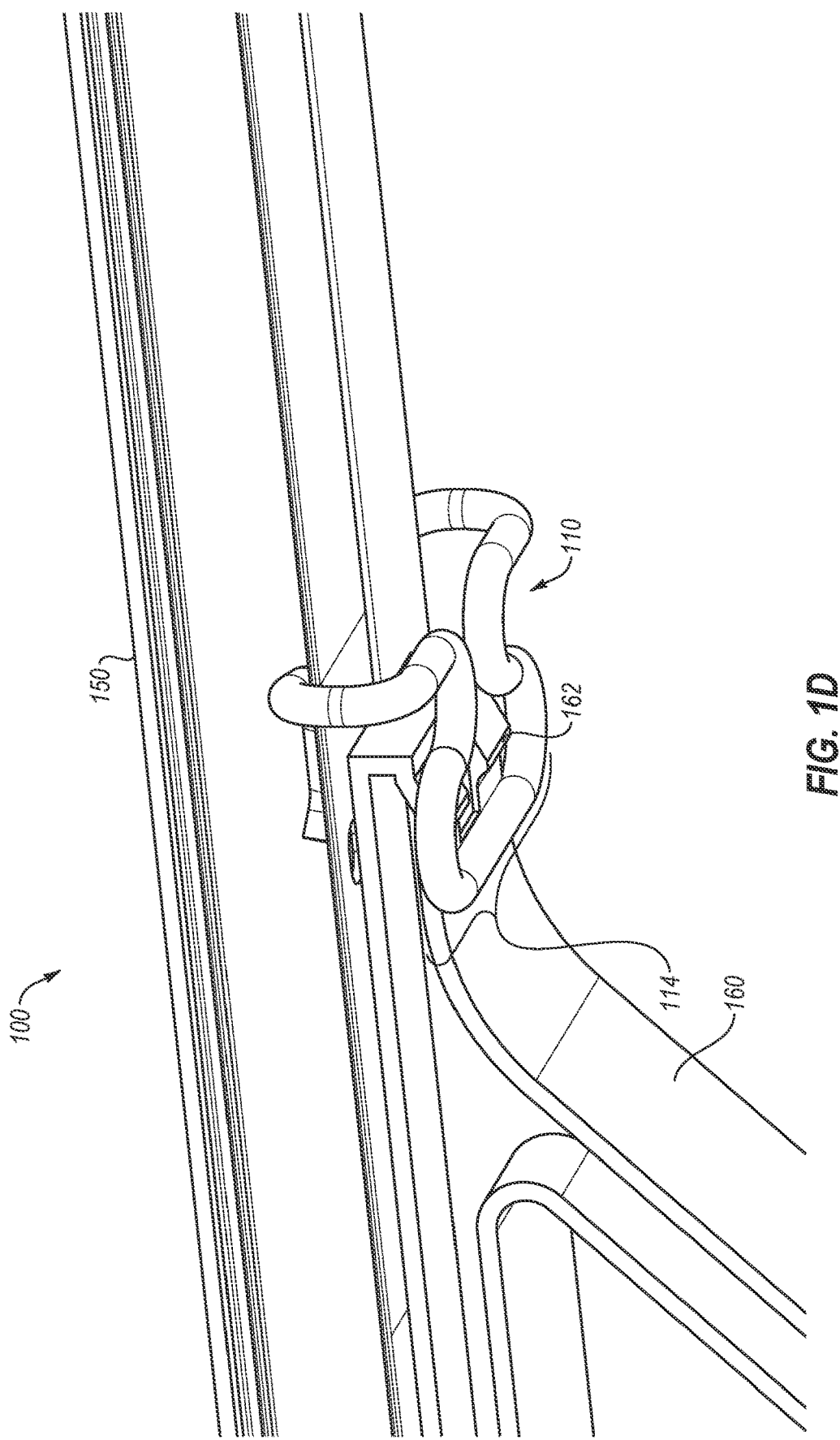

As illustrated in FIG. 1C, after being mounted over the flanges 152 of the PV module frame 150, the spring clip 110 may be slid towards the mounting rail 160. The mounting rail 160 may include a lock ramp 162 formed into a surface of the mounting rail opposite the surface that interfaces with the PV module frame 150. The spring clip 110 may include a mounting rail interfacing portion, such as a central loop 114 that is sized to correspond to the locking ramp 162. As the spring clip 110 is slid along the length of the PV module frame 150 toward a final position of the spring clip 110, the central loop 114 of the spring clip 110 may interface with, and then be forced up and over the locking ramp 162, such as shown in FIG. 1D.

In some embodiments, the lock ramp 162 may have a feature, shape, protrusion, etc. to prevent the spring clip 110 from shifting back up over the lock ramp 162. For example, the lock ramp 162 may have a profile like that of a shark dorsal fin.

In some embodiments, the spring clip 110 may be designed and shaped such that a certain amount of force is applied to each of the flanges 152 of the PV module frame 150 and the mounting rail 160, effectively pinching the PV module frame 150 and the mounting rail 160 together. In these and other embodiments, the applicable force may be determined as of when the spring clip 110 is in the position illustrated in FIG. 1D. The spring clip 110 may be designed to provide sufficient spring force to keep the PV module frame 150 and the mounting rail 160 locked in position relative to each other when experiencing known forces applied to the PV module frame 150 and mounting rail 160. Such forces may include the weight of the PV modules themselves, the forces due to rotating a torque tube when tracking the sun, forces due to wind, rain, snow, etc., or any other forces to which the PV module frame 150 and mounting rail 160 are known to be exposed.

In some embodiments, the spring clip 110 may apply forces to the PV module frame 150 and the mounting rail 160 even before being forced up and over the lock ramp 162. For example, the central loop 114 may be positioned such that in a passive form of the spring clip 110, the central loop 114 is closer to the PV module frame 150 than the surface of the mounting rail 160 such that the spring clip 110 is deformed a first amount to get the central loop onto the surface of the mounting rail 160. As the spring clip 110 is slid along, up, and over the lock ramp 162, the spring clip 110 may be deformed a further amount and may return to approximately the first amount of deformation after dropping in past the lock ramp 162.

While the example of a single spring clip 110 is illustrated, it will be appreciated that multiple spring clips 110 may be used to couple the PV module frame 150 with the mounting rail 160.

Figure 2A:
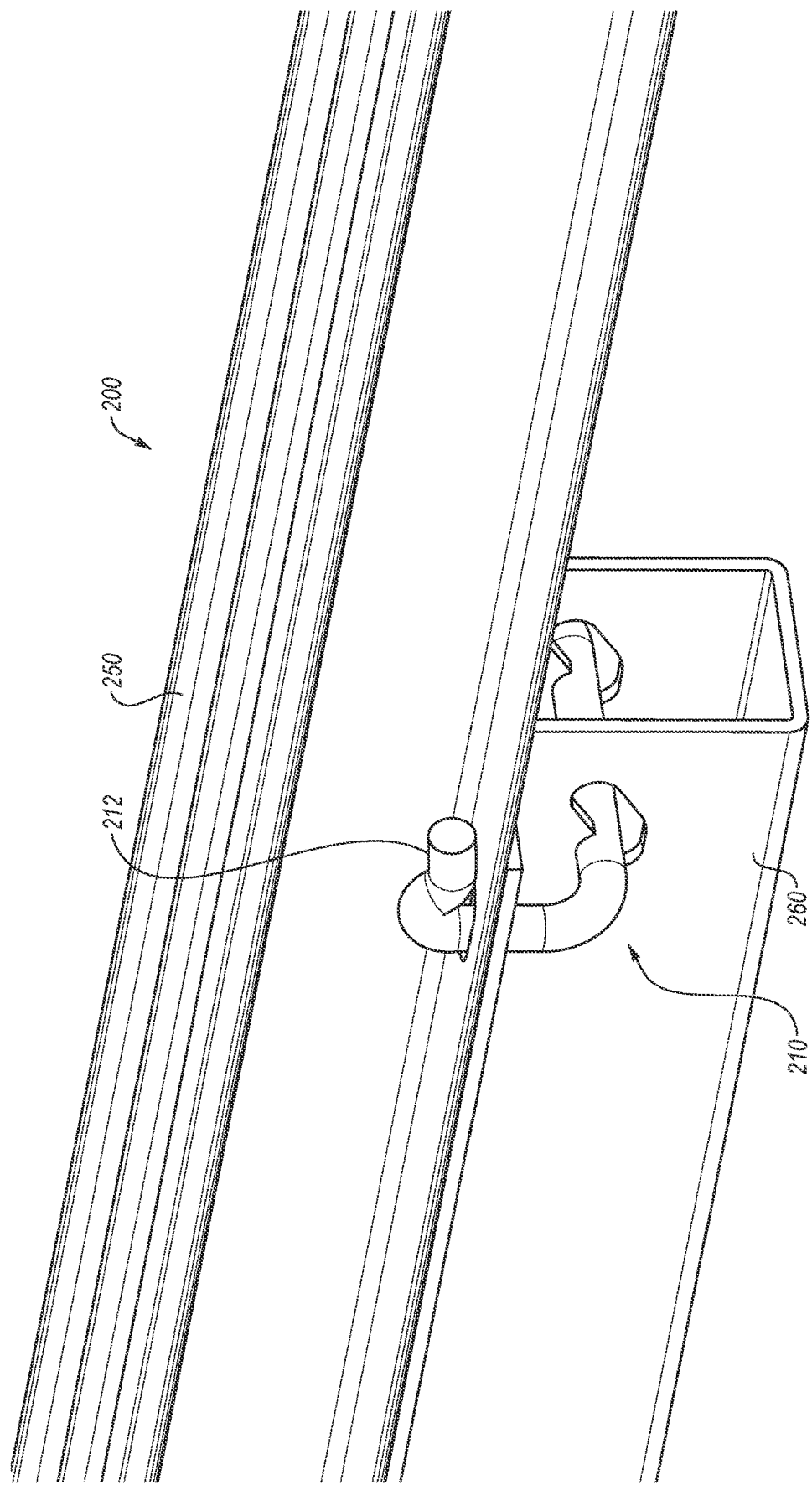
FIGS. 2A-2D illustrate another example embodiment of a module mounting system with a spring clip in accordance with the present disclosure.
Figure 2B:
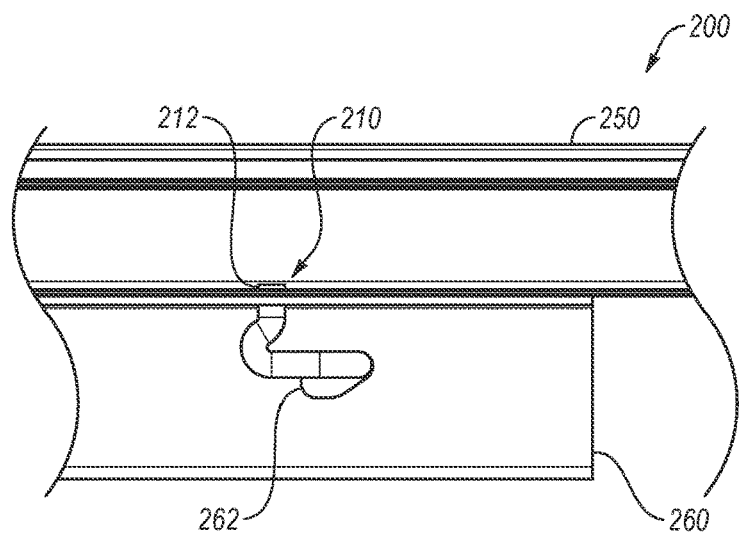
Figure 2C:
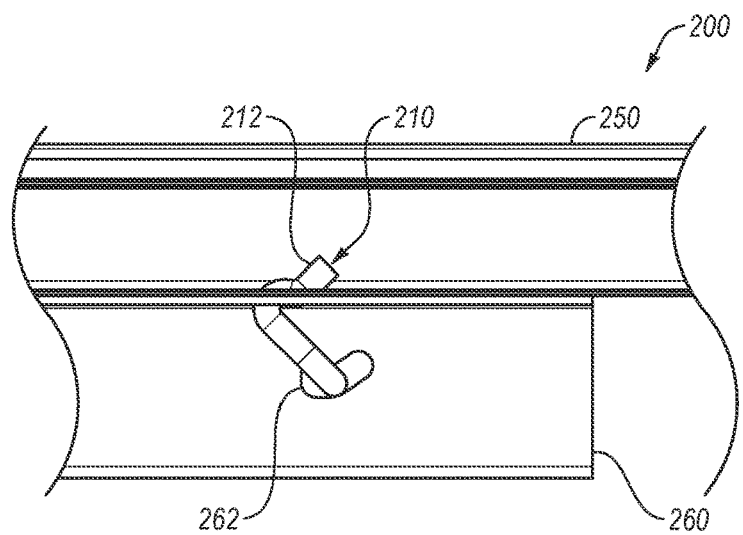
Figure 2D:
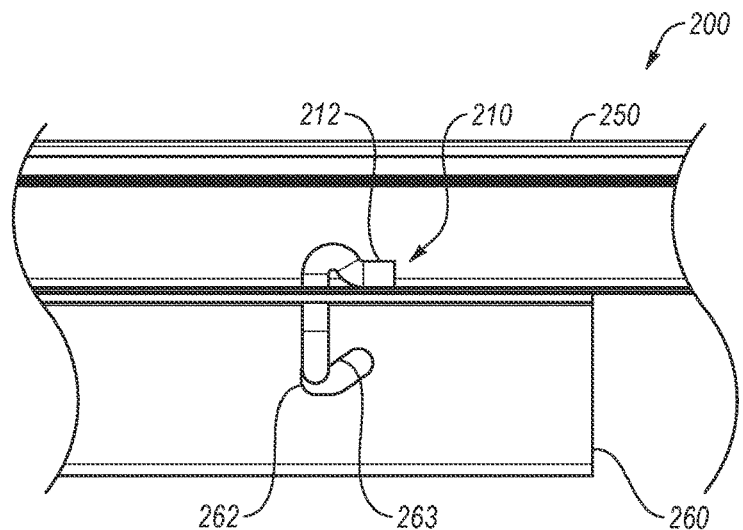

FIGS. 2A-2D illustrate another example embodiment of a module mounting system 200 with a spring clip 210 in accordance with one or more embodiments of the present disclosure. The module mounting system 200 may include similarly numbered components and elements as illustrated in FIGS. 1A-1D, such as a PV module frame 250 that may be similar or comparable to the PV module frame 150, and a mounting rail 260 that may be similar or comparable to the mounting rail 160. FIG. 2A illustrates a perspective view of the spring clip 210 locked into place as also illustrated in FIG. 2D.

As illustrated in FIGS. 2A-2D, the mounting rail 260 may include a slot 262 within which the spring clip 210 may reside. For example, during a manufacturing process, the spring clip 210 may be formed at least partially in the slot 262 such that the spring clip 210 is captive in the slot 262. In this way, when shipping and/or arranging for installation, an installer does not need to be aware of or concern themselves with carrying the spring clips 210 separately as they will be located within the slot 262.

The spring clip 210 may be shaped with arms 212 configured to project up into holes in the flanges of the PV module frame 250 placed to correspond with the slot 262 and the spring clip 210. For example, as illustrated in FIG. 2B, the PV module frame 250 may be positioned atop the mounting rail 260 such that the arms 212 of the spring clip 210 are able to project up into the hole.

As illustrated in the transitions from FIG. 2B to FIGS. 2C and 2D, the spring clip 210 may be pushed back along the slot 262 and transition from an initial position shown in FIG. 2B to a final position shown in FIG. 2D by rotating about the base of the arms 212. In some embodiments, the flexion of the angle in the spring clip 210 near the arms 212 provides the spring force to lock the PV module frame 250 and the mounting rail 260 together.

As illustrated in FIG. 2D, in some embodiments, the slot 262 may include a lock ramp 263 such that as the spring clip 210 is forced up and over the lock ramp 263 towards a final position of the spring clip 210, the spring clip 210 may drop into the end of the slot 262 on the other side of the lock ramp 263 to lock the spring clip 210 into place (e.g., after reaching the final position of the spring clip 210). In these and other embodiments, the spring clip 210 and/or the slot 262 may be designed such that when in the position illustrated in FIG. 2D, the spring force of the spring clip 210 is sufficient to lock the mounting rail 260 and the PV module frame 250 relative to each other even when experiencing expected forces (e.g., forces due to wind, rain, solar tracking, etc.).

In some embodiments, the slot 262 may extend to the edge of the mounting rail 260 such that the edge is open. In these and other embodiments, the spring clips 210 may be manufactured and/or shipped separately from the mounting rail 260. The spring clip 210 may be loaded within the slot 262 and then the arms 212 may be inserted into the holes in the PV module frame 250 and pushed back over the lock ramp 263 to lock the spring clip 210 into place. In these and other embodiments, a locking device (not shown) may be placed over the edge of the mounting rail 260 and/or in the slot 262 to prevent the spring clip 210 from rotating back up and over the lock ramp 263, or from coming out of the slot 262.

FIGS. 3A-3F illustrate an additional example embodiment of a module mounting system 300 with a spring clip 310 in accordance with the present disclosure. The module mounting system 300 may include similarly numbered components and elements as illustrated in FIGS. 1A-1D and/or FIGS. 2A-2D, such as a PV module frame 350 that may be similar or comparable to the PV module frames 150 and/or 250, and a mounting rail 360 that may be similar or comparable to the mounting rail 160 and/or 260. The spring clip 310 may operate in a manner similar to a spring top bottle in locking the PV module frame 350 and the mounting rail 360 together.

The spring clip 310 may include an upper component with arms 312, and a lower component with a central loop 314. The upper portion and lower portion may include a hinge point 316 (such as the hinge points 316a and 316b on each side of the spring clip as shown in FIG. 3D) about which upper component and lower component rotate relative to each other. For example, the upper component may include a post that extends through a hole in the lower component to make the hinge point 316, although any configuration that permits the two components to rotate relative to each other is within the scope of the present disclosure (e.g., the lower component may include the post and the upper component may include the hole, etc.).

Figure 3B:
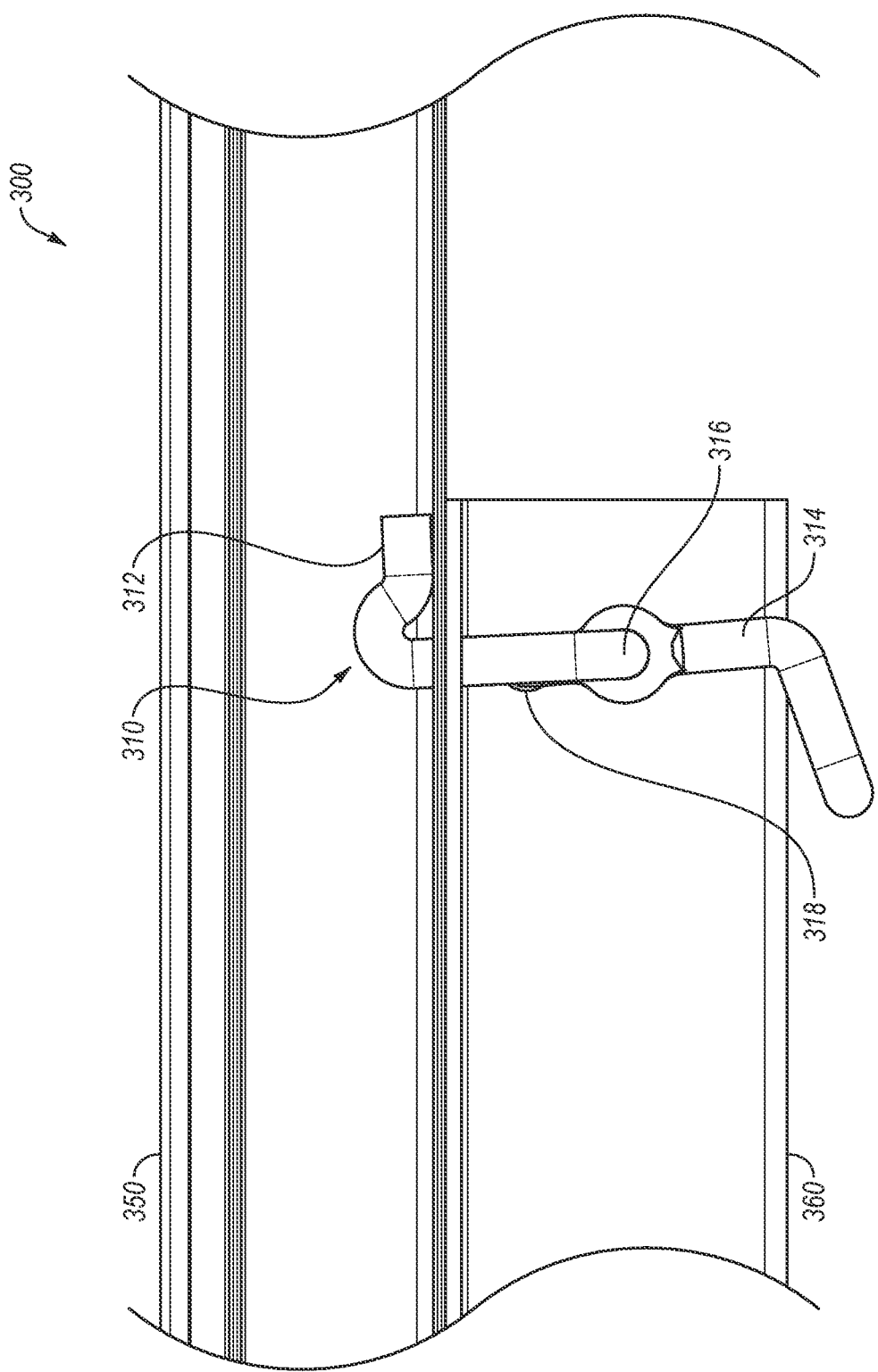

In some embodiments, ends of the lower component may extend through a hole in the mounting rail 360 to form a pivot point 318 (such as the pivot points 318a and 318b on either side of the spring clip 310) about which the entire spring clip 310 may rotate relative to the mounting rail 360. By using the combination of the hinge point 316 and the pivot point 318, the spring clip may be able to rotate back and lock into place, as observed in the transitions from FIGS. 3A, to 3B, to 3C. For example, the central loop 314 may be rotated down and around the end of the mounting rail 360 until the central loop 314 is against the bottom surface of the mounting rail 360 (e.g., the surface on the opposite side from the PV module frame 350). As another example, arms 312b of the upper component as illustrated in FIG. 3E may extend upward as the lower component is rotated such that the arms 312b extend through corresponding holes in the mounting rail 360 and/or the PV module frame 350.

When moving from an initial open position (e.g., as shown in FIG. 3A) to a final locked position (e.g., as shown in FIG. 3C), the hinge point 316 may move from one side of the pivot point 318 to another. By doing so, the arm 312 may prevent and/or resist the upper component from shifting, and as the hinge point 316 and pivot point 318 are aligned vertically, the greatest compressive force is applied to the PV module frame 350 and the mounting rail 360. As the hinge point 316 moves past the pivot point 318, the physical forces tend to force the central loop 314 against the mounting rail 360 as the physical forces attempt to rotate the hinge point 316 further past the pivot point 318 to reduce the compressive force.

In some embodiments, the mounting rails 360 may be manufactured and/or shipped for installation with the spring clip 310 already with posts through the holes at the pivot point 318. During installation, the PV module frame 350 may be moved laterally relative to the mounting rail 360 until a hole corresponding to the arm 312 may be in position such that the arm 312 may be guided up through the hole. In some embodiments, such guidance may utilize movement of the PV module frame 350 relative to the mounting rail 360. The hole for the arm 312 in the PV module frame 350 may be similar or comparable to the hole described with reference to FIGS. 2A-2D.

In these and other embodiments, the spring clip 310 may be designed such that when in the locked position (e.g., illustrated in FIG. 3C), the spring clip 310 may apply sufficient force to lock the PV module frame 350 relative to the mounting rail 360 when exposed to the expected forces.

In some embodiments, the mounting rail 360 may include a lock ramp (not illustrated) along a bottom surface of the mounting rail 360. As the central loop 314 progresses up and over the lock ramp and past the lock ramp, the lock ramp may include a feature to prevent the central loop 314 from rotating back over the lock ramp. For example, the lock ramp may include a similar shape or profile as that illustrated for the lock ramps 162 and 263 in FIG. 1C and/or FIG. 2D, respectively.

As illustrated in FIG. 3F, in some embodiments, a spring clip 311 (which may be similar or comparable to the spring clip 310) may include arms 313 (such as the arms 313a/313b) rather than the arms 312. For example, the arms 313a and 313b may be positioned to rotate up and around the outside of the PV module frame 350 such that the arms 313a/313b may press against the top surface of the PV module frame 350 rather than projecting up and through the PV module frame 350 for the arms 312. After being rotated up and into position atop the PV module frame 350, the central loop 314 may be rotated into the locked position in a similar or comparable manner to that described with reference to FIGS. 3A-3E.

Modifications, additions, or omissions may be made to any of FIGS. 1A-3F of the present disclosure. For example, changes as described herein may be made in accordance with the knowledge of a person of ordinary skill in the art. For example, the mounting rail and/or the PV frames may take any form or shape, and the spring clip shape may be adjusted to accommodate any such changes.

In some embodiments, the spring clips of the various embodiments of the present disclosure may be formed via a single span of metal rod that may be formed, shaped, bent, etc. to have the form illustrated in FIGS. 1A-3F. Additionally, or alternatively, the spring clips may be formed via multiple spans of metal joined or coupled together into the forms illustrated in FIGS. 1A-3F. In some embodiments, various portions of the spring clip may be pressed, stamped, or otherwise formed to have a flat surface rather than a rounded surface, such as the surfaces of the wings and/or the central loop that interface with the flanges and the mounting rail, respectively.

Figure 4A:
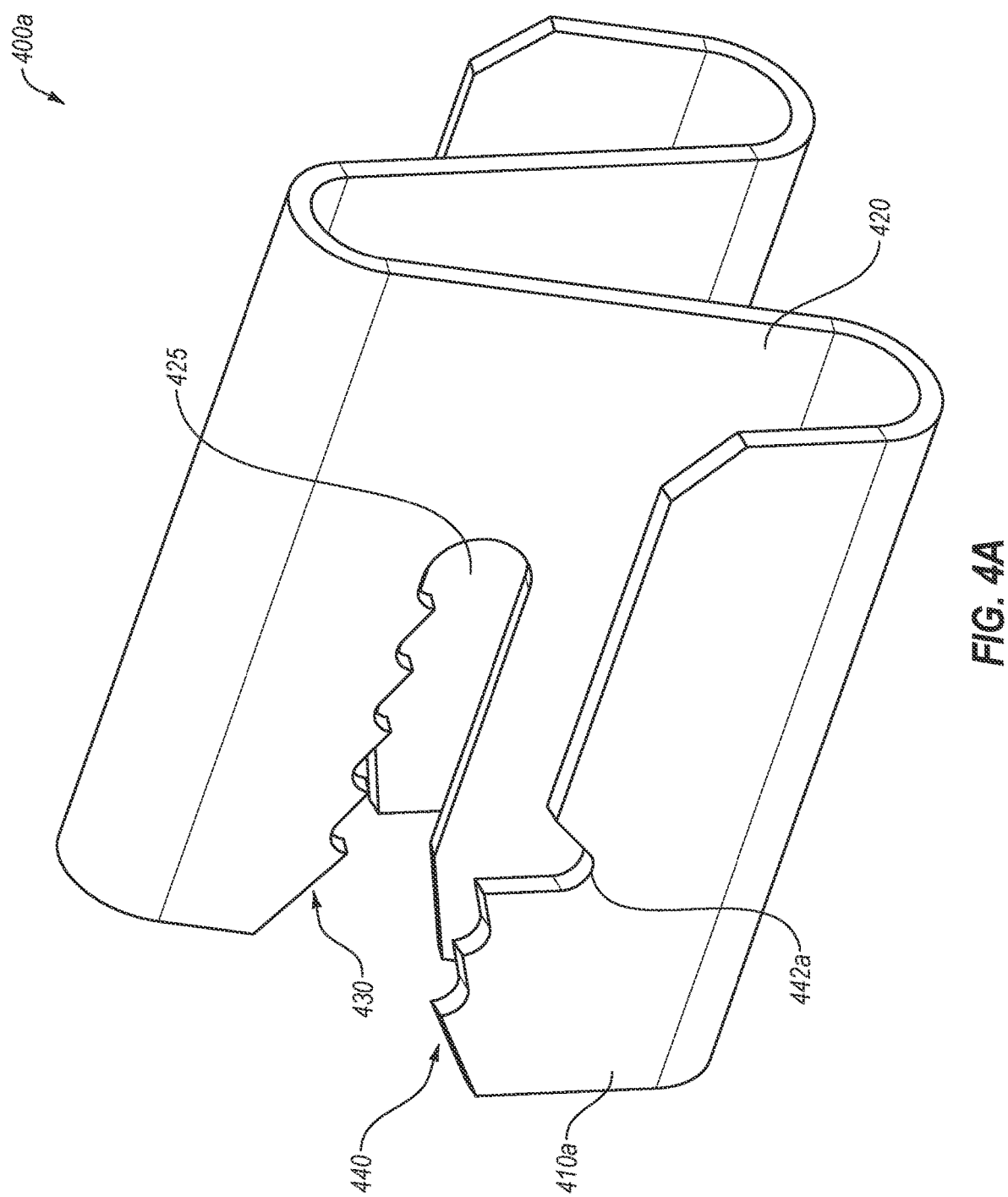
FIG. 4A illustrates a first example embodiment of a first screwless clip for fastening PV module frames according to the present disclosure.

FIG. 4A illustrates a first example embodiment of a first screwless clip 400a for fastening PV module frames according to the present disclosure. The screwless clip 400a may include one or more outer walls 410a and one or more inner walls 420. In some embodiments, the screwless clip 400a may include two outer walls 410a and two inner walls 420 such that the screwless clip includes a W-shaped profile. In some embodiments, the outer walls 410a and the inner walls 420 may be formed from one or more continuous sheets of material, such as metal. For example, the screwless clip 400a may be shaped by a roll-forming process, molding, casting, welding two or more sheets together, etc. In some embodiments, the screwless clip 400a may be shaped to include inherent structural strength in a vertical direction, which may prevent the PV module frame and/or the mounting purlin from separating under loads. As such, the inner walls 420 may include a greater height than the outer walls 410a. In these and other embodiments, the screwless clip 400a may be formed via a roll-forming process from steel and/or using materials such as extruded aluminum, cast iron, stainless steel, high-density polyethylene, polyvinyl chloride, etc. In some embodiments, the screwless clip 400a may be formed of a material that is electrically conductive.

The outer walls 410a may include locking tabs 440 and/or a locking recession 442a. In some embodiments, the locking tabs 440 and/or the locking recession 442a may interface with a surface of a flange corresponding to the mounting purlin and/or the PV module frame to facilitate fastening the PV module frame to the mounting purlin. In some embodiments, the outer walls 410a may include the locking tabs 440 on one or more edges of the outer walls 410a such that the locking tabs 440 of the outer walls 410a are oriented in an upward-facing direction. In some embodiments, the outer walls 410a may include the locking recession 442a on the edges of the outer walls 410a adjacent to the locking tabs 440. In these and other embodiments, the locking recession 442a may be positioned behind the locking tabs 440 along the same edge as the locking tabs 440 such that the locking recession 442a is positioned closer to the center of the edge of the outer walls 410a than the locking tabs 440. Additionally or alternatively, the inner walls 420 may include grounding teeth 430 configured to interface with a surface of the mounting purlin and/or the PV module frame.

In some embodiments, a slot opening 425 may be included in one or more of the inner walls 420, and the grounding teeth 430 may be formed along a top edge of the slot opening 425. The width of the slot opening 425 may be smaller than the thickness of a mounting flange of a mounting purlin and/or a frame flange of a PV module frame to which the screwless clip 400a is coupled such that the screwless clip 400a exerts a preset amount of clamping force on the flanges of the mounting purlin and/or the PV module frame. In some embodiments, the locking tabs 440 may interface with adjoining holes in the PV module frame and/or the mounting purlin to reduce and/or prevent relative sliding motions between the PV module frame and the mounting purlin.

In some embodiments, the grounding teeth 430 and/or teeth on the locking tabs 440 may work in cooperation to provide a resistive force relative to the screwless clip 400a being removed after being slid into place to couple a surface of the mounting purlin and/or the PV module frame. For example, the grounding teeth 430 and/or the teeth on the locking tabs 440 may be oriented towards the back of the slot opening 425 such that as a force is applied to draw the screwless clip 400a away from the surface of the mounting purlin and/or the PV module frame, the grounding teeth 430 and/or the teeth on the locking tabs 440 may bite in deeper to the material, acting as barbs.

FIG. 4B illustrates a second example embodiment of a second screwless clip 400b for fastening PV module frames according to the present disclosure. In some embodiments, the screwless clip 400b may include inner walls that are the same as or similar to the inner walls 420 of the screwless clip 400a in that a slot may be included in the surface of each inner wall and grounding teeth may be included along a top edge of the slot. Additionally or alternatively, the screwless clip 400b may include a semicircular locking recession 442b along one or more outer walls 410b of the screwless clip 400b without locking tabs included along the top edge of the outer walls 410b. Although illustrated as semicircular in shape, the locking recession 442b may take any shape (such as rectangular, rounded rectangular, etc.).

Figure 5A:
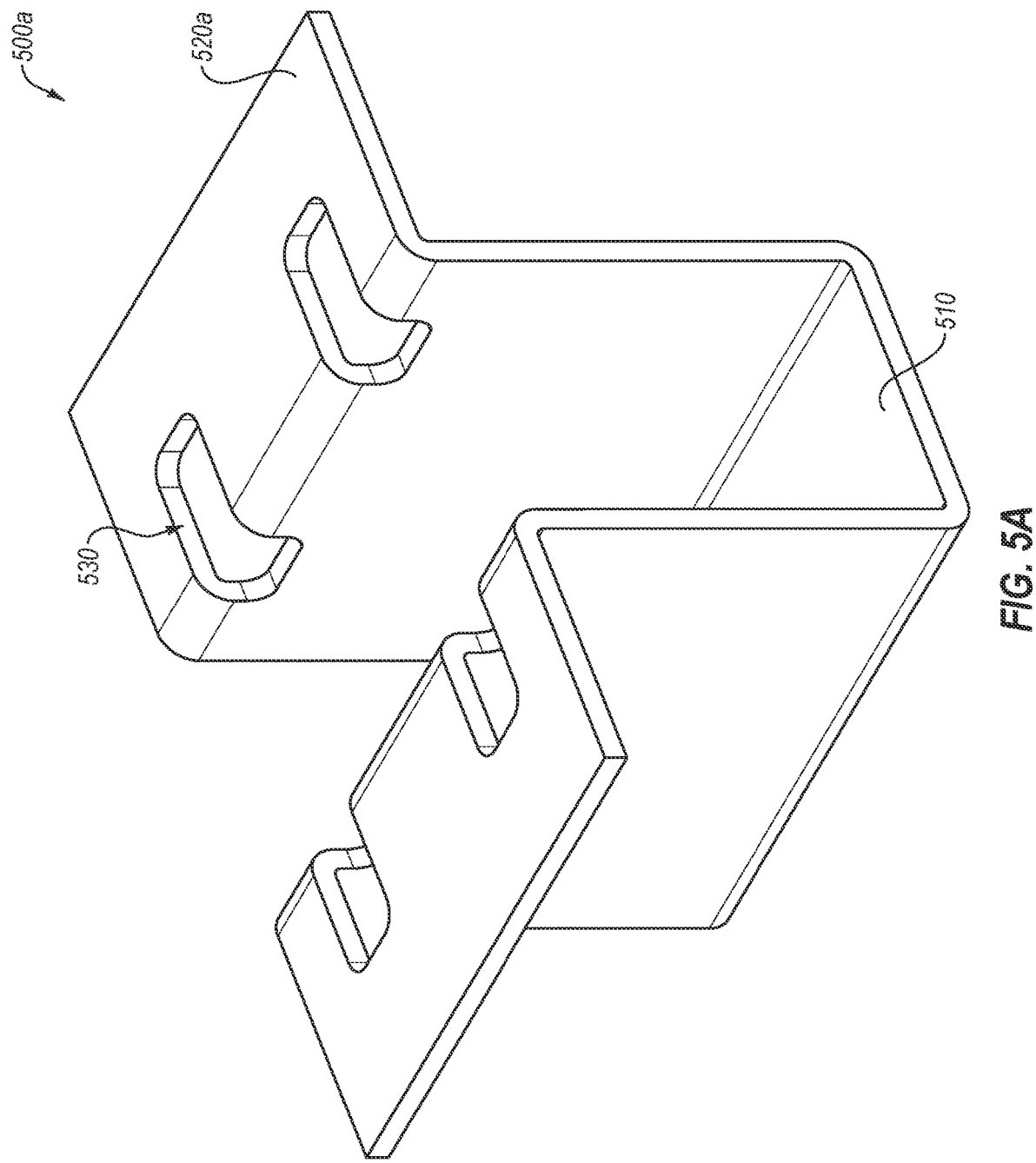
FIG. 5A illustrates a first example embodiment of a first mounting purlin according to the present disclosure.

FIG. 5A illustrates a perspective view of a first example embodiment of a first mounting purlin 500a according to the present disclosure. The first mounting purlin 500a illustrated in FIG. 5A may include a short-section view of a mounting purlin, and a length of the first mounting purlin 500a may vary depending on a length of the PV modules coupled to the first mounting purlin 500a. For example, the first mounting purlin 500a may include a longer length to accommodate a longer PV module length (or a shorter length to accommodate a shorter PV module length). In some embodiments, the mounting purlin 500a may include a seating section 510, one or more mounting flanges 520a, and/or one or more mounting slots 530. In these and other embodiments, the mounting purlin 500a may include any shape, such as a circular shape, triangular shape, an aperture opening, etc.

The mounting flanges 520a and/or the mounting slots 530 may extend laterally from the top of the seating section 510 (e.g., from a "brim" of the top-hat shaped mounting purlin 500a). In some embodiments, the mounting flanges 520a may be flat or substantially flat such that a flange of the PV module frame may be positioned flush against the mounting flange 520a. Additionally or alternatively, a screwless clip, such as the screwless clips 400a and/or 400b (collectively "screwless clip(s) 400"), may interface with the mounting purlin 500a via the mounting flanges 520b and/or the mounting slots 530. In some embodiments, the mounting slots 530 may provide an opening through which the grounding teeth of the screwless clip 400 and/or the locking tabs 440 may extend to secure the screwless clip 400 to the mounting purlin 500a and/or reduce and/or prevent sliding movement of the screwless clip 400 and/or the PV module frame.

Figure 5B:
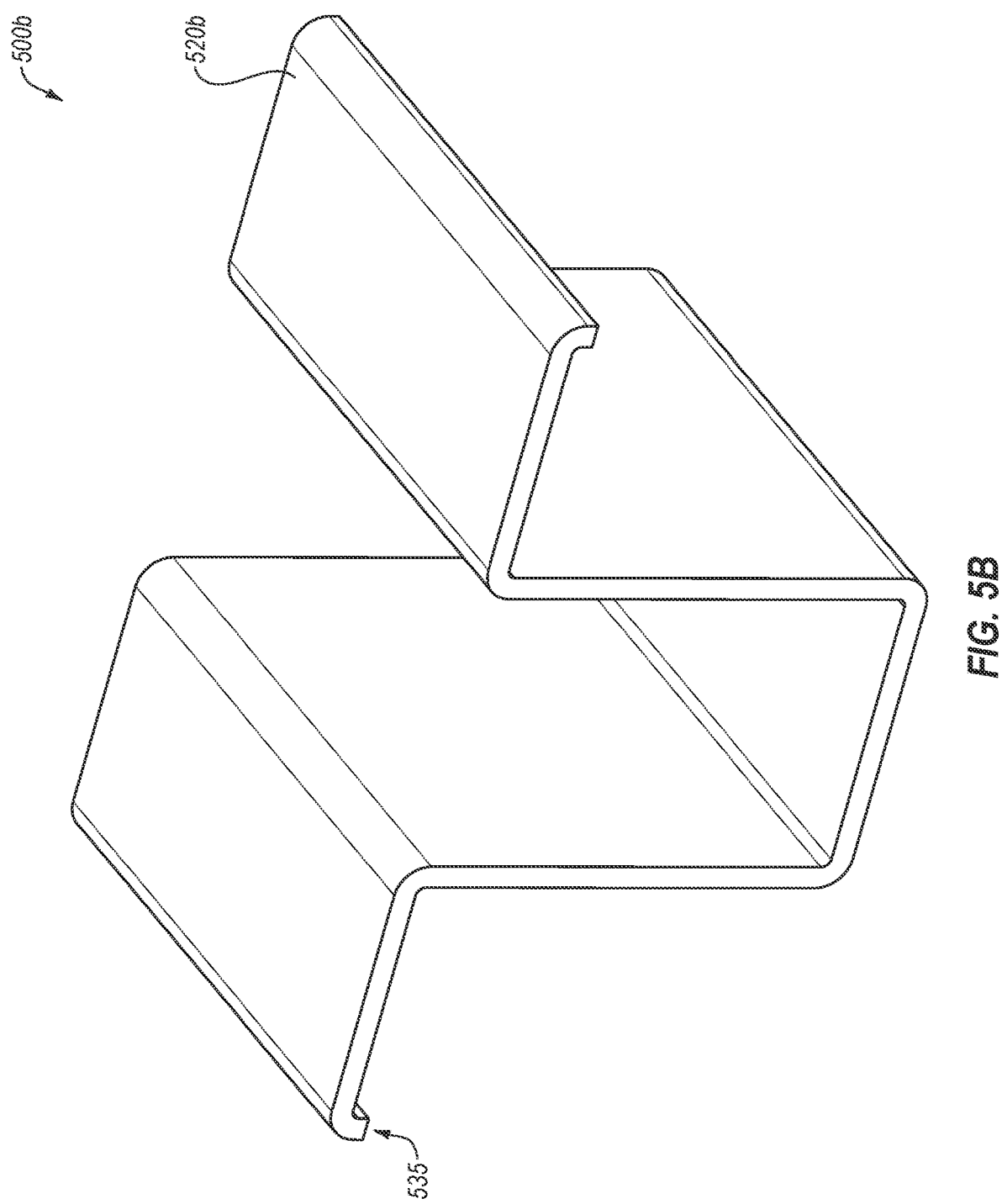
FIG. 5B illustrates a second example embodiment of a second mounting purlin according to the present disclosure.

FIG. 5B illustrates an example embodiment of a second mounting purlin 500b according to the present disclosure. In some embodiments, the second mounting purlin 500b may include one or more mounting flanges 520b, and each of the mounting flanges 520b may include an edge lip 535 along part of or an entire edge of one or both of the mounting flanges 520b. In these and other embodiments, the edge lip 535 may be configured to interface with the locking recession 442b of the screwless clip 400b described in relation to FIG. 4B. For example, one of the mounting flanges 520b may extend into a slot of the screwless clip 400b, and the edge lip 535 may interface with the locking recession 442b in the outer walls of the screwless clip 400b to reduce and/or prevent sliding movement of the screwless clip 400b and/or an associated PV module frame. For example, the edge lip 535 interfacing with the locking recession 442b may prevent any backing out and/or other removal of the screwless clip 400b.

Figure 6A:
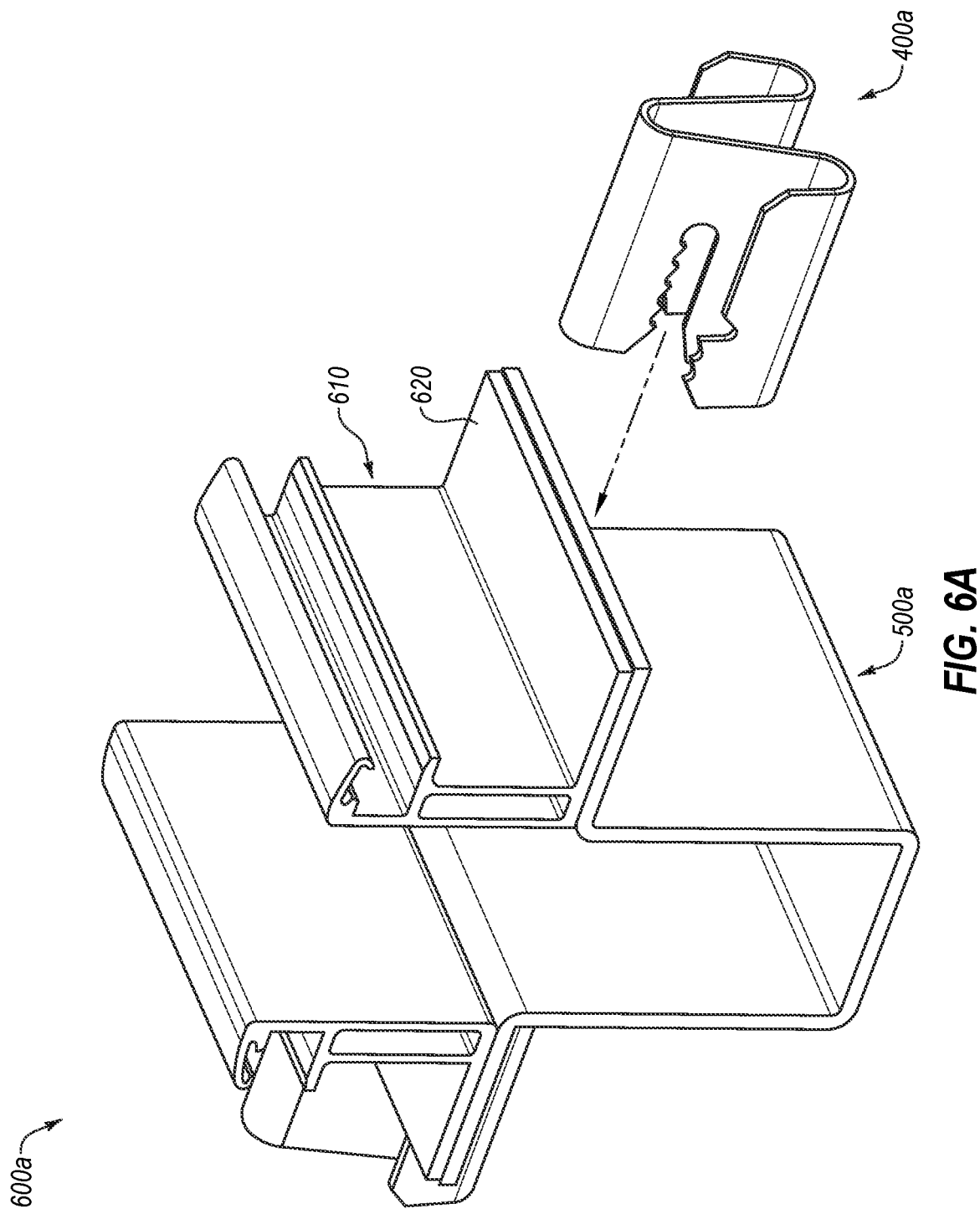
FIG. 6A illustrates a view of an example embodiment of a first mounting assembly including the first screwless clip and the first mounting purlin coupled to a PV module frame according to the present disclosure.

FIG. 6A illustrates a view of an example embodiment of a first mounting assembly 600a including the screwless clip 400a and the mounting purlin 500a coupled to a PV module frame 610 according to the present disclosure. The PV module frame 610 may include one or more frame flanges 620 that are flat or substantially flat and may be positioned flush against a top surface of the mounting flanges of the mounting purlin 500a. Although the mounting flanges and the frame flanges 620 are illustrated in FIG. 6A as having the same shape and surface area, some offset in alignment between the mounting flanges and the frame flanges 620 may be tolerated and are contemplated within the present disclosure. Additionally or alternatively, although the mounting flanges and the frame flanges 620 are illustrated in FIG. 6A as having the same thickness, some disparities in flange thickness may be tolerated. In these and other embodiments, the screwless clips 400a may include varying configurations in which the slot openings 425 of the screwless clips 400a include differing lengths, widths, and/or heights to accommodate mounting flanges 520 and/or frame flanges 620 of varying thicknesses and/or lengths.

In some embodiments, the screwless clip 400a may be coupled to the mounting assembly 600a such that the upward-oriented locking tabs 440 of the screwless clip 400a interface with a bottom surface of the frame flange 620 of the PV module frame 610 through the slots in the mounting purlin 500a, and the downward-oriented grounding teeth 430 of the screwless clip 400a interface with a top surface of the frame flange 620 of the PV module frame 610. The locking tabs 440 interfacing with the bottom surface of the frame flange 620 and/or the grounding teeth 430 interfacing with the top surface of the frame flange 620 may increase the gripping force that the screwless clip 400a exerts on the frame flange 620 of the PV module frame 610 and/or the flange of the mounting purlin 500a such that relative sliding movements between the PV module frame 610 and the mounting purlin 500a are reduced and/or prevented. Additionally or alternatively, the frame flanges 620 may include slots that correspond to the slots of the mounting purlin 500a.

While the example of a single screwless clip 400a is illustrated, it will be appreciated that multiple screwless clips 400a may be used to couple the PV module frame 610 with the mounting purlin 500a.

Figure 6B:
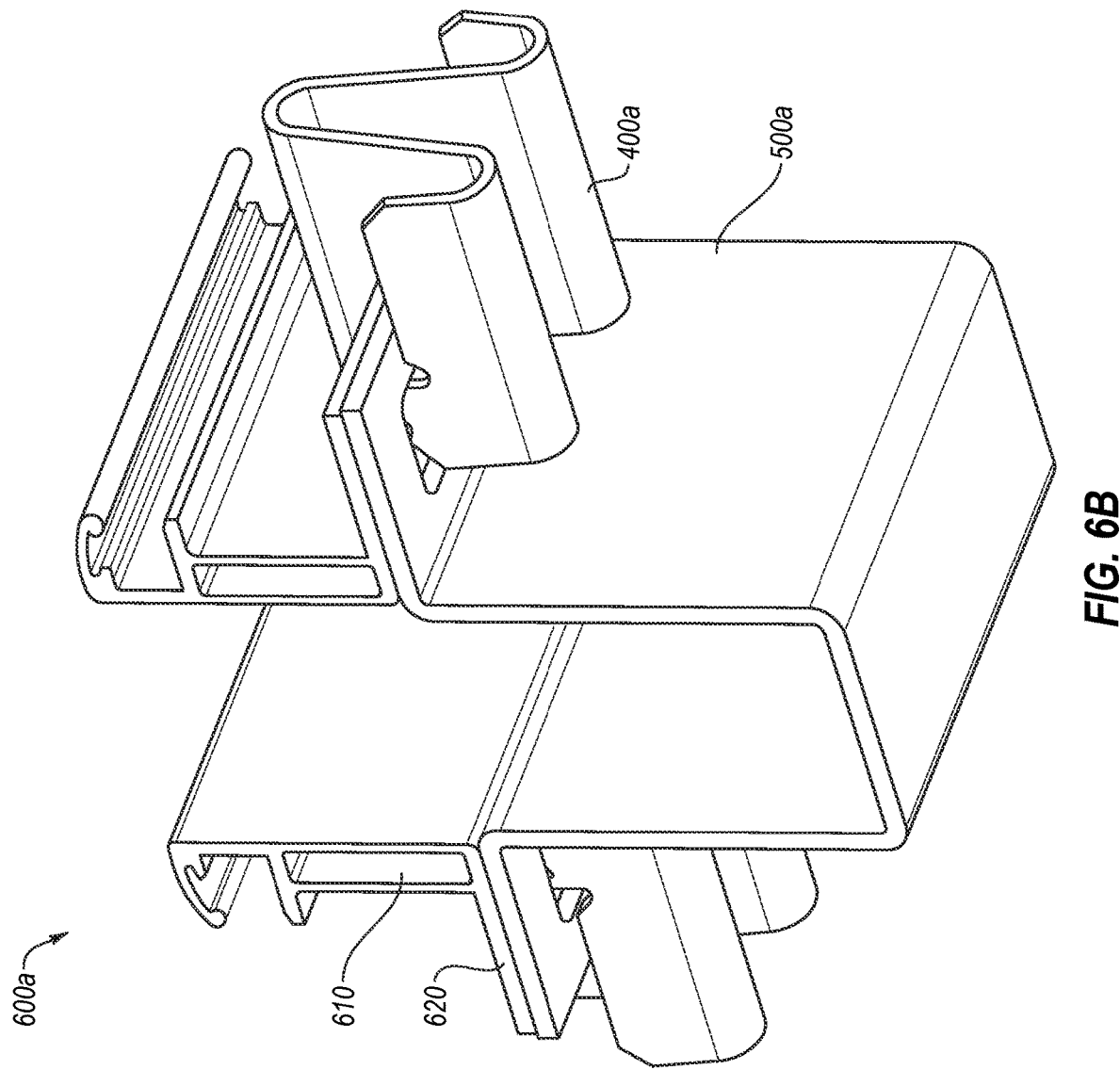
FIG. 6B illustrates a second view of the example embodiment of the first mounting assembly illustrated in FIG. 6A, according to the present disclosure.

FIG. 6B illustrates a second assembly view of the example embodiment of the first mounting assembly 600a according to the present disclosure. As shown in FIG. 6B, the locking tabs of the screwless clip 400a may extend through the slots of the mounting purlin 500a and interface with the bottom surface of the frame flange 620 of the PV module frame 610.

Figure 6C:
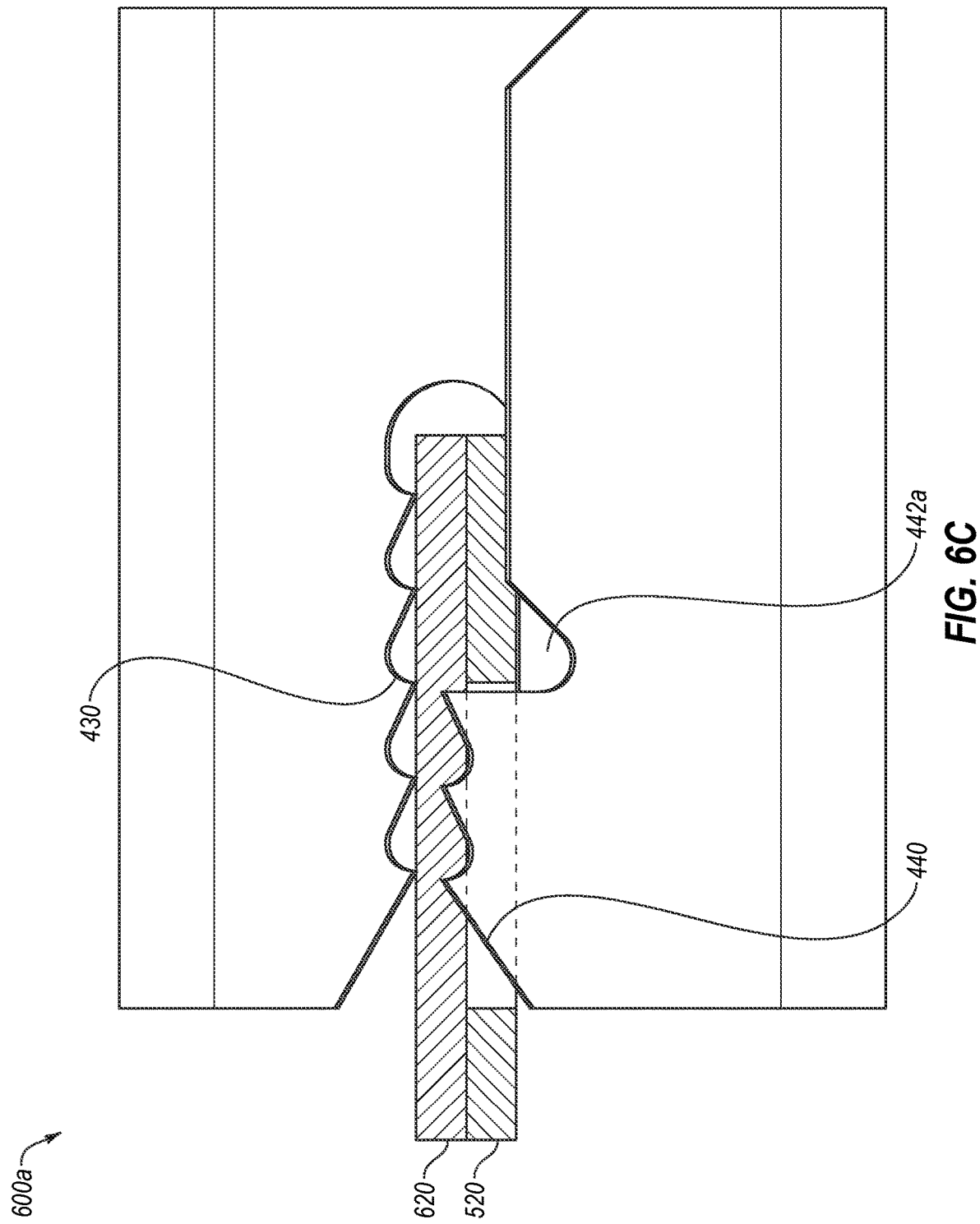
FIG. 6C illustrates a side view of the example embodiment of the first mounting assembly illustrated in FIG. 6A, according to the present disclosure.

FIG. 6C illustrates a side view of the example embodiment of the first mounting assembly 600a according to the present disclosure. As illustrated in the side view of the mounting assembly 600a, the grounding teeth 430 and/or the locking tabs 440 may interface with the top and/or bottom surfaces of the frame flange 620 of the PV module frame (not shown), respectively.

In some embodiments, the PV module frame may include a thin layer of anodized aluminum, which is typically electrically insulative. In these and other embodiments, the layer of anodized aluminum may range from one micron to ten microns in thickness. To facilitate grounding of the PV module through the mounting purlin, the grounding teeth 430 may cut into the layer of anodized aluminum such that the screwless clip 400a is in direct contact with an electrically conductive material underneath the layer of anodized aluminum. In these and other embodiments, the screwless clip 400a may facilitate grounding of a given PV module through the PV module frame to which the given PV module is attached by providing a low-resistance grounding path through the mounting purlin.

Figure 6D:
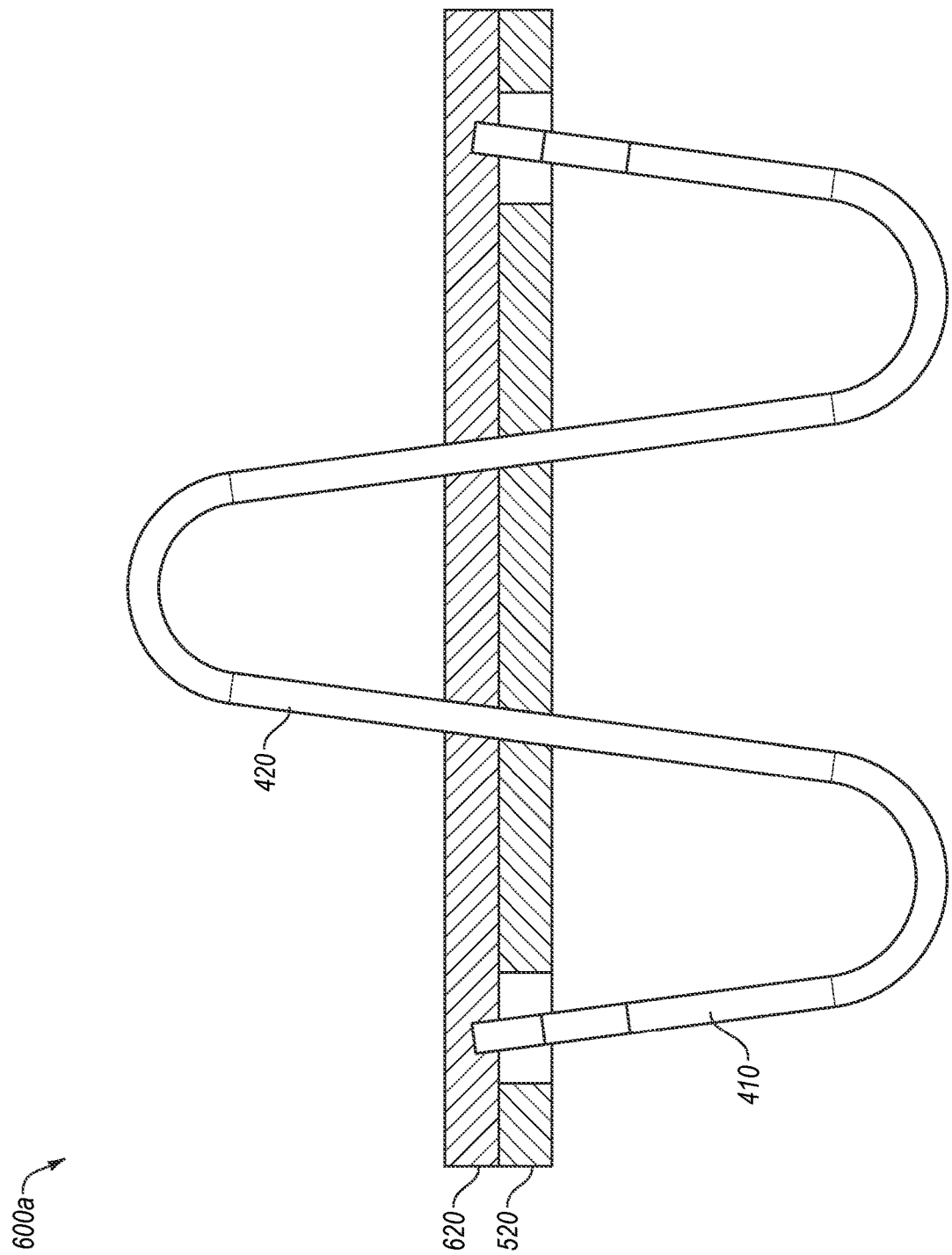
FIG. 6D illustrates a front view of the example embodiment of the first mounting assembly illustrated in FIG. 6A, according to the present disclosure.

FIG. 6D illustrates a front view of the example embodiment of the first mounting assembly 600a according to the present disclosure. In some embodiments, the shape of the screwless clip 400 may facilitate the secure attachment of the screwless clip 400 to the mounting purlin and/or the PV module frame. The longer inner walls 420 of the screwless clip 400 may provide structural strength for the screwless clip 400 in a vertical direction, which may prevent the PV module frame and/or the mounting purlin from separating under load. Additionally or alternatively, the shorter outer walls 410 of the screwless clip 400 may provide opposing spring forces that reduce and/or dissipate rattling, vibrations, sliding, etc. of the screwless clip 400 during operation of the PV modules.

Figure 6E:
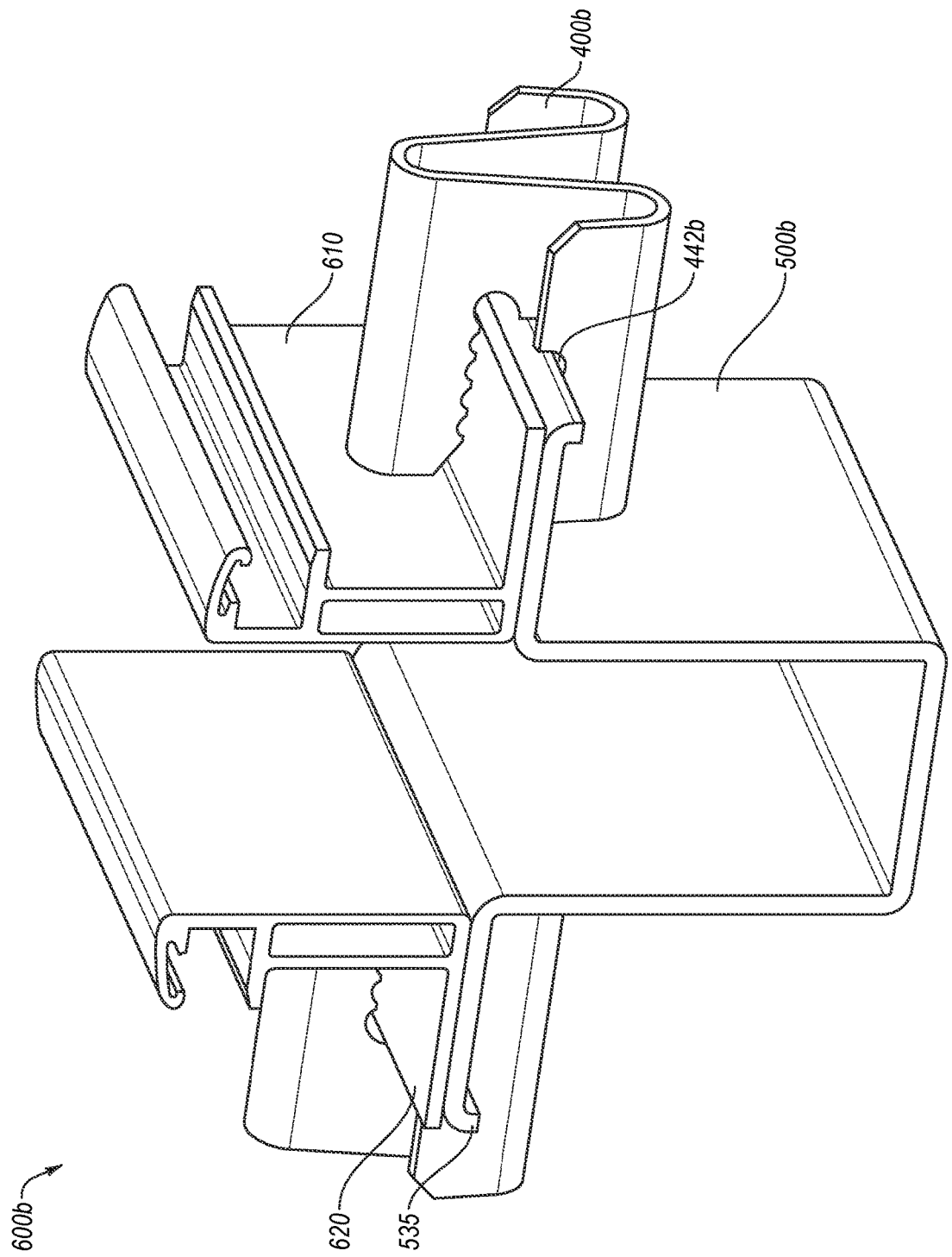
FIG. 6E illustrates a view of an example embodiment of a second mounting assembly including the second screwless clip illustrated in FIG. 4B and the second mounting purlin illustrated in FIG. 5B coupled to a PV module frame according to the present disclosure.

FIG. 6E illustrates an isometric view of an example embodiment of a second mounting assembly 600b including the screwless clip 400b and the mounting purlin 500b coupled to the PV module frame 610 according to the present disclosure. A top edge of the outer wall of the screwless clip 400b may interface with a bottom surface of the mounting flange of the mounting purlin 500b, and the grounding teeth of the screwless clip 400b may interface with a top surface of the frame flange 620 of the PV module frame 610. The edge flange 535 at the end of the mounting flange of the mounting purlin 500b may interface with the locking recession 442b to reduce and/or prevent sliding movement of the screwless clip 400b, the mounting purlin 500b, and/or the PV module frame 610.

Figure 7A:
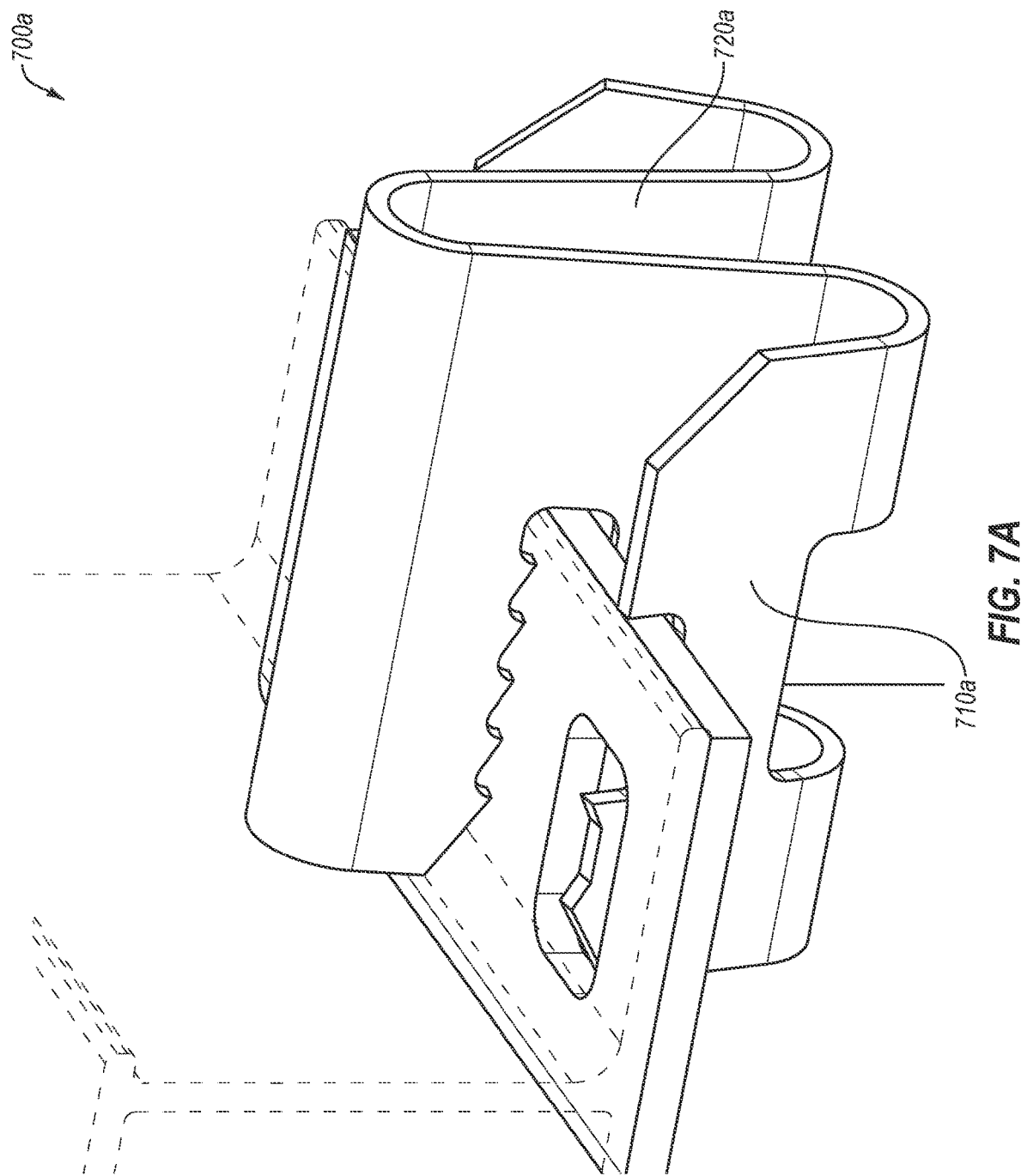
FIG. 7A illustrates an example embodiment of a third screwless clip according to the present disclosure.
Figure 7B:
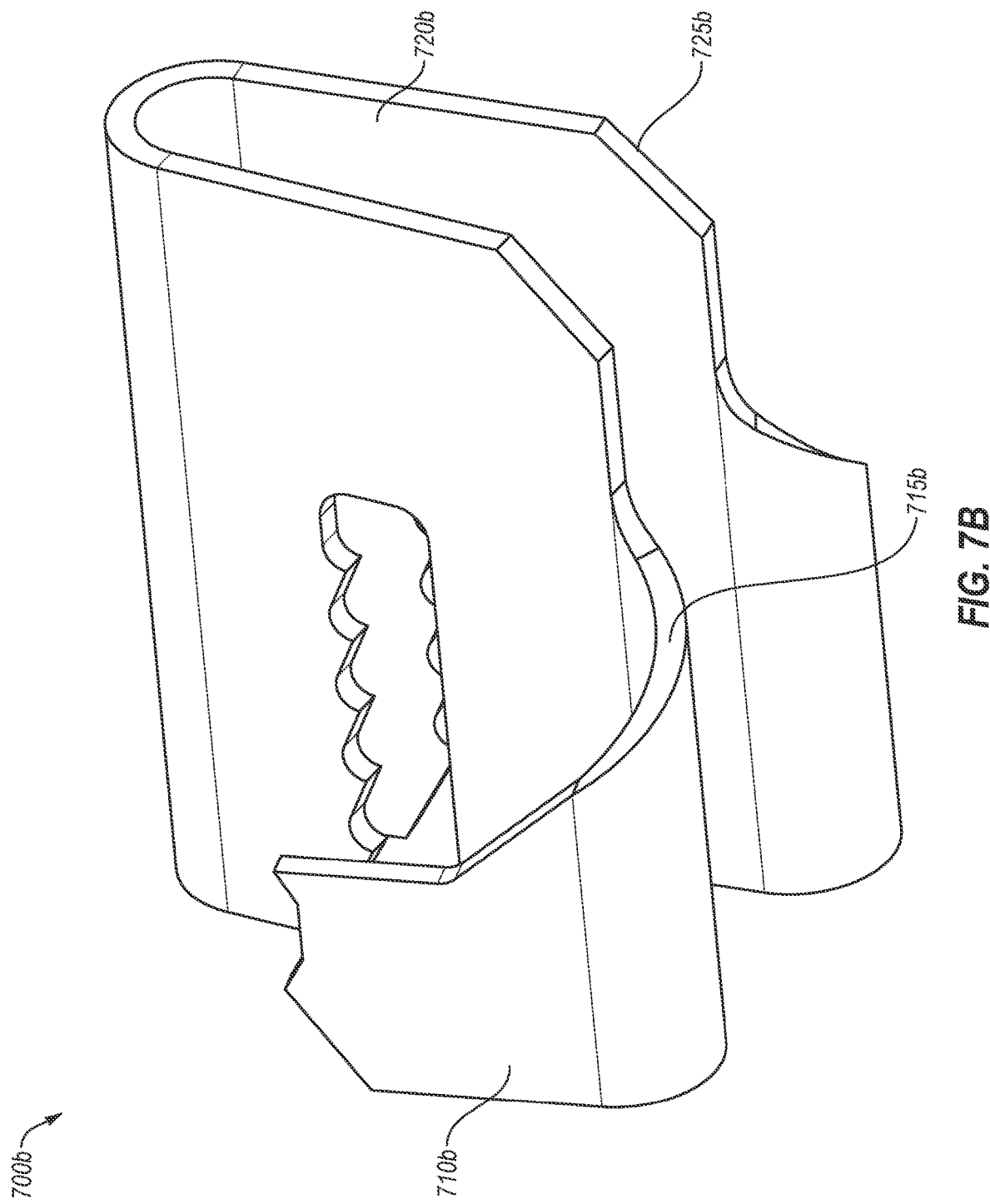
FIG. 7B illustrates an example embodiment of a fourth screwless clip according to the present disclosure.
Figure 7C:
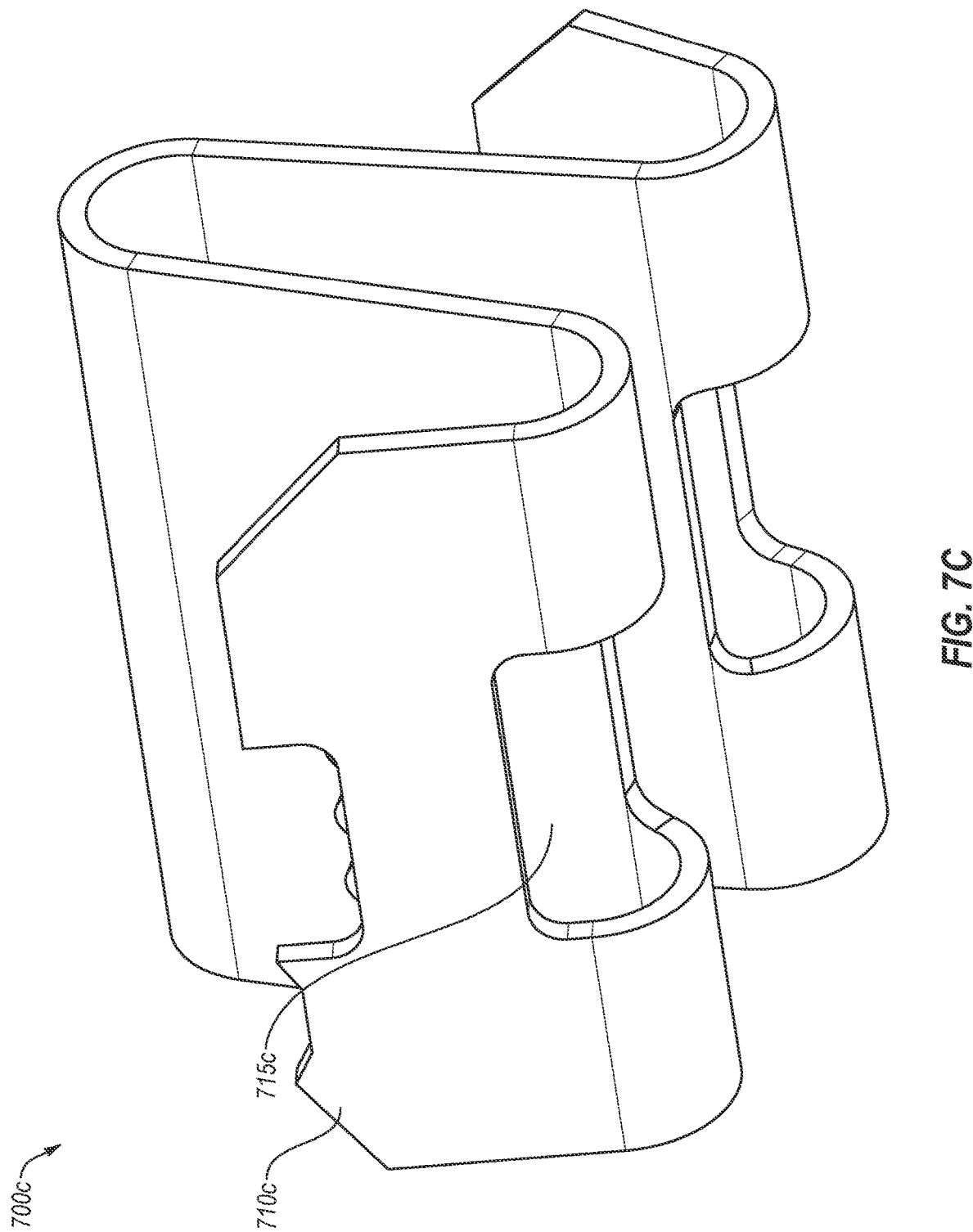
FIG. 7C illustrates an example embodiment of a fifth screwless clip according to the present disclosure.

FIGS. 7A-7C illustrate various example embodiments of screwless clips 700a-c according to the present disclosure. In some embodiments, a screwless clip 700a, as illustrated in FIG. 7A, may include one or more outer walls 710a connected to one or more 720a inner walls in which an angle of bending between the outer walls 710a and the inner walls 720a is wider than an angle of bending between the two inner walls 720a. Stated another way, the gap between the top of the two inner walls 720a may be wider than the gap between the bottom of the two inner walls 720a. The angle of bending between two given walls may adjust the compression force between the mounting flange of the mounting purlin and the frame flange of the PV module frame. For example, a wider angle of bending between the inner walls 720a of the screwless clip 700a may reduce the contact between an upward-facing edge of the outer walls 710a and the bottom surface of the mounting flange and/or the bottom surface of the frame flange (e.g., the contact between the locking tabs 440 and the bottom surface of the frame flange through the mounting slot), which may reduce the compression force between the mounting purlin and the PV module frame. As another example, a narrower angle of bending between the inner walls 720a may increase the contact between the upward-facing edge of the outer walls 710a and the bottom surfaces of the of the mounting flange and/or the frame flange, which may increase the compression force between the mounting purlin and the PV module frame.

In some embodiments, a screwless clip 700b, as illustrated in FIG. 7B, may include one or more outer walls 710b that each include a cutoff section 715b. Removing a portion of the outer wall 710b beyond the cutoff section 715b may increase the elasticity of the outer wall 710b relative to longer outer walls (e.g., the outer walls 410, the outer walls 710a, and/or outer walls 710c). In these and other embodiments, the inner walls 720b of the screwless clip 700b may include one or more chamfers 725b that reduce the sharpness of the edges of the inner walls 720b such that installation of the screwless clip 700b may be easier and/or less dangerous for installation technicians (e.g., inserting the screwless clip 700b by hand).

In some embodiments, outer walls 710c of a screwless clip 700c may each include a cutout portion 715c as illustrated in FIG. 7C. For example, the screwless clip 700c may include the cutout portion 715c at a transition between the outer walls and the inner walls with material connecting the outer walls and the inner walls on both ends of the cutout portion 715c. The cutout portions 715c may provide clearance for squeezing the inner walls 720c of the screwless clip 700c together (e.g., by hand, using pliers, etc.), which may facilitate easier installation of the screwless clip 700c on the mounting flange and/or the frame flange.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. It is noted that any of the dependent examples or portions thereof may be combined in any combination, and placed into an independent example, e.g., Examples 1, 2, and 3. The other examples can be presented in a similar manner. The following is a non-limiting summary of some examples presented herein.

Example 1 includes a module mounting system that may include a photovoltaic (PV) module frame enclosing one or more PV cells. The module mounting system may include a mounting rail shaped to interface with the PV module frame and one or more support structures to which the mounting rail is coupled to keep the mounting rail off the ground. The module mounting system may include a spring clip with a PV module frame interfacing portion and a mounting rail interfacing portion in which the spring clip is shaped to apply spring force via deformation of the spring clip to force the mounting rail and the PV module frame against each other.

In some examples, the module mounting system may further comprise a second PV module frame adjacent to the PV module frame. The PV module frame and the second PV module frame may include a first flange and a second flange, respectively, and the first flange and the second flange may extend in opposite directions and each interface with a top surface of the mounting rail. The PV module frame interfacing portion of the spring clip may include at least a first and a second wing in which the first wing is configured to slide over the first flange and the second wing to slide over the second flange such that the first wing interfaces with a top surface of the first flange and the second wing interfaces with a top surface of the second flange to fix both the PV module frame and the second PV module frame in place relative to the mounting rail.

In some examples, the PV module frame may include a lock ramp formed into a bottom surface of the mounting rail, and the mounting rail interfacing portion of the spring clip may include a central loop configured to slide over the lock ramp into a final position where the spring clip is forcing the mounting rail and the PV module frame against each other. In these and other examples, the lock ramp may include a profile that facilitates sliding the central loop over the lock ramp in a first direction when moving into the final position and prevents sliding the central loop over the lock ramp in a second direction back out of the final position.

In some examples, the mounting rail may include a slot and at least a portion of the spring clip may be configured to be inserted through the slot to couple the spring clip to the mounting rail. In these and other examples, the module mounting system may further comprise a second PV module frame adjacent to the PV module frame. The PV module frame and the second PV module frame may include a first flange and a second flange, respectively, in which the first flange and the second flange extend in opposite directions. Both the first flange and the second flange may interface with a top surface of the mounting rail, and both the first flange and the second flange may each include a respective hole. The spring clip may include first and second arms configured to project into the holes of the first and second flanges to facilitate rotation of the spring clip and fixing the first and the second PV module frames in place relative to the mounting rail. In these and other examples, the slot may be shaped to include a lock ramp having a protruding shape that facilitates sliding the portion of the spring clip inserted through the slot in a first direction to a final position and prevents sliding the spring clip inserted through the slot in a second direction out of the final position.

Example 2 includes a spring clip that may include an upper component including one or more arms. The spring clip may include a lower component including a central loop in which the upper component and the lower component are configured to rotate relative to each other about a hinge point to transition from an initial position to a final position in which the final position causes the arms of the upper component to interface with a PV module frame and the central loop of the lower component to interface with a mounting rail to force the mounting rail and the PV module frame against each other.

In some examples, the hinge point may be at an interface between the upper component and the lower component, include a post in one of the upper and the lower components, and include a hole through which the post projects in an other of the upper and the lower components. In these and other examples, the arms of the upper component may be configured to rotate from below the PV module frame to above the PV module frame such that the arms of the upper component press against a top surface of the PV module frame in the final position.

In some examples, the mounting rail of the PV module frame may include one or more holes, and the ends of the lower component may be configured to extend through the holes of the mounting rail to form a pivot point that facilitates rotation of the spring clip relative to the mounting rail.

In some examples, the arms of the upper component may extend upward and be sized to extend through corresponding holes in both the mounting rail and the PV module frame to interface with a top surface of the PV module frame and a majority of the upper component extending below a top surface of the mounting rail.

Example 3 includes a module mounting system that includes a mounting purlin including one or more mounting flanges extending horizontally from the mounting purlin and a PV module frame including one or more frame flanges extending horizontally from the PV module frames in which each of the frame flanges may interface against a respective mounting flange of the mounting purlin. The module mounting system may include one or more screwless clips interfacing with the mounting flanges and the frame flanges in which each of the screwless clips includes one or more outer walls and one or more inner walls formed of a continuous sheet of material in a generally W-shaped profile.

In some examples, a gap between a top of the inner walls may be wider than a gap between a bottom of the inner walls.

In some examples, a height of each of the inner walls may be greater than a height of each of the outer walls. In these and other examples, the screwless clip may include a slot in the inner walls extending a majority of a length of the screwless clip in which the screwless clip interfaces with the mounting flanges and the frame flanges at least in the slot. In these and other examples, the screwless clip may include a plurality of grounding teeth positioned along the slot with the grounding teeth configured to interface with a surface of the frame flange and bite through an anodized layer of the frame flange to electrically couple the frame flange and the mounting flange.

In some examples, one or more of the outer walls may include a plurality of locking tabs oriented in an upward-facing direction positioned along respective edges of the outer walls. The outer walls may each include a locking recession positioned along a same respective edge of the outer walls as the plurality of locking tabs with the locking recession being positioned closer to the centers of the respective edges of the outer walls than the plurality of locking tabs and having a lower height than the plurality of locking tabs. In these and other examples, each of the screwless clips may include a cutout portion at a transition between the outer walls and the inner walls with material connecting the inner walls and the outer walls on both ends of the cutout portion. In these and other examples, each of the mounting flanges may include an edge lip such that the respective edge lip interfaces with the locking recession of the respective screwless clip.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A module mounting system, comprising:
   a mounting rail shaped to interface with a photovoltaic (PV) module frame, the mounting rail including a locking portion comprising a lock ramp disposed along a bottom surface of the mounting rail;
   one or more support structures to which the mounting rail is coupled; and
   a mounting clip with a PV module frame interfacing portion and a mounting rail interfacing portion, the mounting clip shaped to apply force via deformation of the mounting clip to force the mounting rail and the PV module frame against each other and wherein the mounting rail interfacing portion is configured to engage with the locking portion, wherein the mounting rail interfacing portion comprises a central loop configured to slide over and engage with the lock ramp.

2. The module mounting system of claim 1, wherein the mounting rail is shaped to further interface with a second PV module frame, wherein:
   the PV module frame that the mounting rail is shaped to interface with includes a first flange that extends in a first direction and interfaces with a top surface of the mounting rail;
   the second PV module frame includes a second flange that extends in a second direction and interfaces with the top surface of the mounting rail; and
   the PV module frame interfacing portion of the mounting clip includes at least a first and a second wing, the first wing configured to slide over the first flange and the second wing configured to slide over the second flange such that the first wing interfaces with a top surface of the first flange and the second wing interfaces with a top surface of the second flange.

3. The module mounting system of claim 1, wherein the lock ramp includes a profile that facilitates sliding the central loop over the lock ramp in a first direction and prevents sliding the central loop over the lock ramp in a second direction.

4. A module mounting system, comprising:
   a mounting rail shaped to interface with a first flange of a first photovoltaic (PV) module frame and a second flange of a second PV module frame; and
   a mounting clip with a PV module frame interfacing portion and a mounting rail interfacing portion, the mounting clip shaped to force the mounting rail and the PV module frame against each other;
   wherein the PV module frame interfacing portion includes a first wing portion configured to engage a top surface of the first flange and a second wing portion configured to engage a top surface of the second flange.

5. The module mounting system of claim 4, wherein the mounting rail interfacing portion is configured to engage with a locking portion disposed on the mounting rail.

6. The module mounting system of claim 5, wherein the locking portion comprises a lock ramp disposed along a surface of the mounting rail and the mounting rail interfacing portion includes a surface configured to slide over and engage with the lock ramp.

7. The module mounting system of claim 6, wherein the lock ramp includes a profile that facilitates sliding the surface of the mounting rail interface portion over the lock ramp in a first direction and prevents sliding the surface over the lock ramp in a second direction.

8. A module mounting system, comprising:
   a mounting rail shaped to interface with a first photovoltaic (PV) module frame and a second PV module frame, wherein:
      the mounting rail comprises a locking portion;
      the first PV module frame comprises a first flange that extends in a first direction and is configured to interface with a top surface of the mounting rail; and
      the second PV module frame comprises a second flange that extends in a second direction and is configured to interface with the top surface of the mounting rail;
   a support structure to which the mounting rail is coupled; and
   a mounting clip comprising:
      a PV module frame interfacing portion comprising;
         a first wing configured to slide over the first flange to interface with a top surface of the first flange; and
         a second wing configured to slide over the second flange to interface with a top surface of the second flange; and
      a mounting rail interfacing portion configured to engage with the locking portion, wherein the mounting clip is shaped to apply a force via deformation of the mounting clip to force the mounting rail and the PV module frame against each other.

* * * * *